United States Patent
Yoon et al.

(10) Patent No.: US 10,038,834 B2
(45) Date of Patent: Jul. 31, 2018

(54) VIDEO CALL METHOD AND DEVICE

(71) Applicant: Samsung Electronics Co., Ltd., Gyeonggi-do (KR)

(72) Inventors: Geon Ho Yoon, Seoul (KR); Dong Il Son, Gyeonggi-do (KR); Chi Hyun Cho, Gyeonggi-do (KR); Chang Ryong Heo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/429,752

(22) Filed: Feb. 10, 2017

(65) Prior Publication Data

US 2017/0251138 A1    Aug. 31, 2017

(30) Foreign Application Priority Data

Feb. 25, 2016  (KR) .................. 10-2016-0022774

(51) Int. Cl.
  *H04N 7/15*   (2006.01)
  *H04N 5/232*  (2006.01)
  *H04N 7/14*   (2006.01)

(52) U.S. Cl.
  CPC ..... *H04N 5/23206* (2013.01); *H04N 5/23219* (2013.01); *H04N 5/23296* (2013.01); *H04N 7/142* (2013.01)

(58) Field of Classification Search
  None
  See application file for complete search history.

(56) References Cited

U.S. PATENT DOCUMENTS

| | | |
|---|---|---|
| 7,027,808 B2 | 4/2006 | Wesby |
| 7,391,028 B1 | 6/2008 | Rubenstein |
| 7,558,564 B2 | 7/2009 | Wesby |
| 7,737,410 B2 | 6/2010 | Rubenstein |
| 8,158,950 B2 | 4/2012 | Rubenstein |
| 8,180,336 B2 | 5/2012 | Wesby |
| 8,324,589 B2 | 12/2012 | Rubenstein |
| 8,457,622 B2 | 6/2013 | Wesby |
| 8,504,007 B2 | 8/2013 | Wesby |
| 8,563,937 B2 | 10/2013 | Rubenstein |
| 8,577,358 B2 | 11/2013 | Wesby |
| 8,577,359 B2 | 11/2013 | Wesby |
| 8,880,054 B2 | 11/2014 | Wesby |
| 9,000,386 B2 | 4/2015 | Rubenstein |
| 9,118,701 B2 | 8/2015 | Wesby |
| 2002/0057347 A1* | 5/2002 | Urisaka ............ H04N 7/142 348/211.4 |
| 2002/0067412 A1* | 6/2002 | Kawai ............. H04N 5/232 348/211.99 |
| 2005/0222933 A1 | 10/2005 | Wesby |
| 2006/0122925 A1 | 6/2006 | Wesby |

(Continued)

*Primary Examiner* — Creighton Smith
(74) *Attorney, Agent, or Firm* — The Farrell Law Firm, P.C.

(57) ABSTRACT

The present disclosure provides an electronic device for making a video call. The electronic device includes at least one camera, a communication module, and a processor that makes a video call with an external electronic device by using an image captured by the at least one camera, and if a control signal is received from the external electronic device, through the communication module, controls the at least one camera, based on the control signal.

9 Claims, 23 Drawing Sheets

(56) References Cited

U.S. PATENT DOCUMENTS

| | | | |
|---|---|---|---|
| 2008/0158371 A1* | 7/2008 | Trescott | G03B 17/00 |
| | | | 348/208.7 |
| 2009/0114830 A1 | 5/2009 | Rubenstein | |
| 2009/0247146 A1 | 10/2009 | Wesby | |
| 2009/0252374 A1* | 10/2009 | Ishikawa | H04N 5/144 |
| | | | 382/103 |
| 2010/0103106 A1* | 4/2010 | Chui | G06F 3/017 |
| | | | 345/166 |
| 2011/0307222 A1 | 12/2011 | Rubenstein | |
| 2012/0077544 A1 | 3/2012 | Rubenstein | |
| 2012/0156661 A1 | 6/2012 | Smith et al. | |
| 2012/0243686 A1 | 9/2012 | Wesby | |
| 2013/0003561 A1 | 1/2013 | Wesby | |
| 2013/0048870 A1 | 2/2013 | Rubenstein | |
| 2013/0183958 A1 | 7/2013 | Wesby | |
| 2013/0204980 A1 | 8/2013 | Wesby | |
| 2013/0250034 A1* | 9/2013 | Kang | H04W 4/02 |
| | | | 348/14.02 |
| 2013/0273898 A1 | 10/2013 | Wesby | |
| 2014/0203181 A1 | 7/2014 | Rubenstein | |
| 2015/0043892 A1* | 2/2015 | Groman | G11B 27/034 |
| | | | 386/278 |
| 2015/0044996 A1 | 2/2015 | Wesby | |
| 2015/0326436 A1 | 11/2015 | Wesby | |
| 2015/0334311 A1* | 11/2015 | Paz | H04N 5/232 |
| | | | 348/169 |
| 2016/0349849 A1* | 12/2016 | Kwon | G06F 3/011 |

\* cited by examiner

VIDEO CALL METHOD AND DEVICE

PRIORITY

This application claims priority under 35 U.S.C. § 119(a) to a Korean Patent Application filed on Feb. 25, 2016, in the Korean Intellectual Property Office and assigned Serial No. 10-2016-0022774, the entire disclosure of which is incorporated herein by reference.

BACKGROUND

1. Field of the Disclosure

The present disclosure relates generally to a method and a device that makes a video call between a plurality of electronic devices.

2. Description of the Related Art

High-performance electronic devices, such as robots, are being developed as the distribution of portable electronic devices with various functions, such as smartphones, tablet PCs, and the like, is expanded.

Users may receive a variety of services, such as a video call service, by using the above-mentioned electronic devices. During a video call, an electronic device of a user may receive an image captured by an electronic device of a counterpart and may display the captured image. In this case, the image captured by the electronic device of the counterpart may be determined by only the counterpart of the video call. Thus, when a face of the counterpart is inadvertently not captured in the image sent in the video call or when the user wants to watch the video call in another place, for example, the user may need to request the counterpart to change a capturing direction of a camera of the counterpart's electronic device, however, the user himself is not able to change the capturing direction of the counterpart's electronic device.

SUMMARY

The present disclosure has been made to address at least the above-mentioned problems and/or disadvantages and to provide at least the advantages described below.

Accordingly, an aspect of the present disclosure is to allow a user making a video call to change a capturing direction of a camera included in an electronic device of a counterpart.

According to another aspect of the present disclosure, service quality and user convenience of a video call may be improved by allowing a user to control an electronic device of a counterpart during the video call.

In accordance with an aspect of the present disclosure, an electronic device is provided. The electronic device includes at least one camera, a communication module, and a processor that makes a video call with an external electronic device by using an image captured by the at least one camera, and if a control signal is received from the external electronic device, through the communication module, controls the at least one camera, based on the control signal.

In accordance with another aspect of the present disclosure, an electronic device is provided. The electronic device includes a display, a communication module, and a processor that receives image data, through the communication module, for making a video call with an external electronic device, displays the image data in the display, requests permission, from the external electronic device, to control at least one camera included in the external electronic device, based on a user input, receives approval information about the permission to control, from the external electronic device, through the communication module, generates a control signal for controlling the at least one camera included in the external electronic device, and sends the control signal to the external electronic device, through the communication module.

In accordance with yet another aspect of the present disclosure, an electronic device is provided. The electronic device includes a housing, at least one camera exposed to an outside through the housing, a communication circuit situated in an interior of the housing, a user interface, a processor which is situated in the interior of the housing and which is electrically connected with the at least one camera, the communication circuit, and the user interface, and a memory electrically connected with the processor, wherein the memory stores instructions, the instructions, when executed by the processor, causing the processor to detect a motion of a user of the electronic device by using at least one of the at least one camera or the user interface, control the at least one camera based on the detected motion, receive, through the communication circuit or the user interface, a request for transferring permission to control the at least one camera to an external electronic device, receive, from the external electronic device, through the communication circuit, a control signal for controlling the at least one camera, and control the at least one camera, based on the received control signal.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS OF THE PRESENT DISCLOSURE

Figure 1:
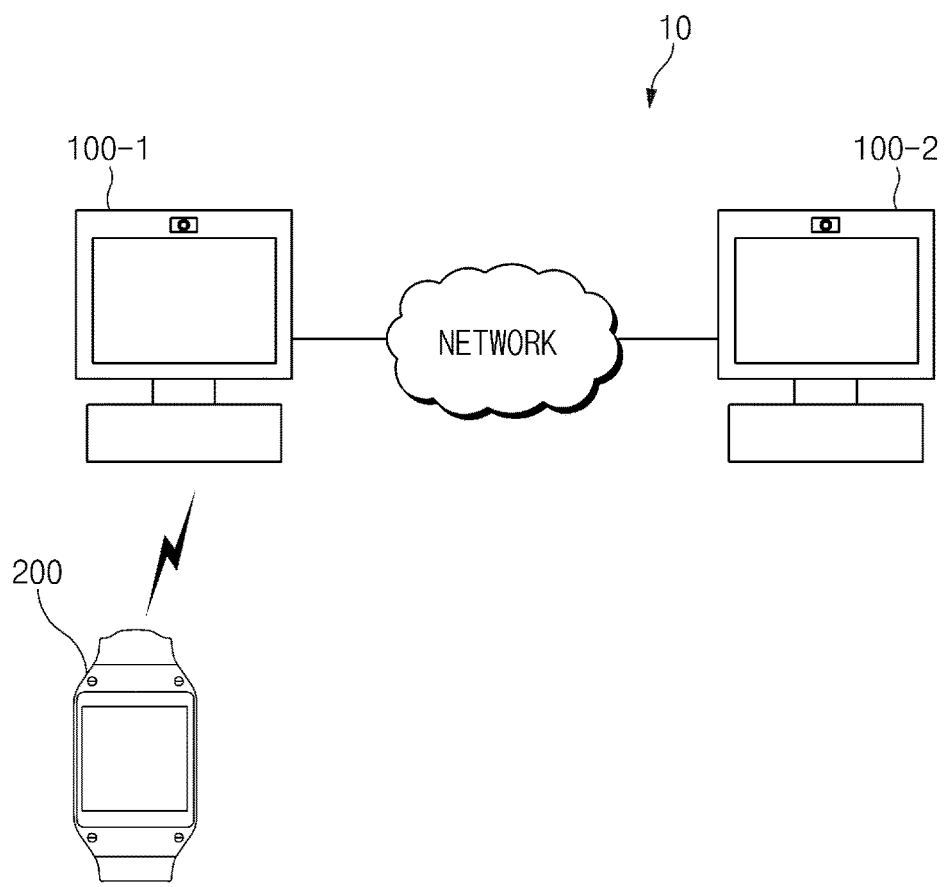
FIG. 1 illustrates a video call system, according to an embodiment of the present disclosure.

Hereinafter, various embodiments of the present disclosure are disclosed with reference to the accompanying drawings, in which like reference numerals refer to like elements. However, the present disclosure is not intended to be limited to a specific embodiment and it is intended that the present disclosure covers all modifications, equivalents, and/or alternatives of the present disclosure provided they come within the scope of the appended claims and their equivalents. The terms "include," "comprise," and "have" used herein refer to the existence of a corresponding feature (e.g., a function, operation, or element) but do not exclude additional features.

As disclosed herein, the expressions "A or B", "at least one of A or/and B", and "one or more of A or/and B", may include any and all combinations of one or more of the associated listed items. For example, the terms "A or B", "at least one of A and B", and "at least one of A or B" may refer to all of (1) A (2) B (3) A and B.

The terms "first", "second", and the like used herein may modify various elements regardless of the order or the importance, but do not limit the elements. For example, "a first user device" and "a second user device" may indicate different user devices regardless of the order or priority thereof. For example, without departing from the scope of the present disclosure, a first element may be referred to as a second element, and similarly, a second element may be referred to as a first element.

It should be understood that when an element (e.g., a first element) is referred to as being "coupled" or "connected" with/to another element (e.g., a second element), the element may be directly coupled or connected with/to the other element or an intervening element (e.g., a third element) may be present. In contrast, when an element (e.g., a first element) is referred to as being "directly coupled" or "directly connected" with/to another element (e.g., a second element), it should be understood that there are no intervening element (e.g., a third element).

As used herein, the expression "configured to" may be used interchangeably, for example, with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms as well, unless otherwise specified. Unless defined otherwise, all the terms used herein, including technical or scientific terms, may have the same meanings as those commonly understood by a person skilled in the art to which the present disclosure pertains. It will be further understood that terms, which are defined in a generally used dictionary, should be interpreted as is customary in the relevant related art and not in an idealized or overly formal manner unless expressly so defined herein. In some cases, even if terms are defined in the specification, they may not be interpreted to exclude embodiments of the present disclosure.

Hereinafter, an electronic device according to an embodiment of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a video call system, according to an embodiment of the present disclosure.

Referring to FIG. 1, a video call system 10 is provided. The video call system 10 includes a first electronic device 100-1, a second electronic device 100-2, and a user terminal device 200.

Each of the first electronic device 100-1 and the second electronic device 100-2 may be a home robot or an industrial robot. The first electronic device 100-1 and the second electronic device 100-2 may be connected with each other through a network. The first electronic device 100-1 and the user terminal device 200 may be devices of a first user, and the second electronic device 100-2 may be a device of a second user.

The first electronic device 100-1 and the second electronic device 100-2 may make a video call through the network. For example, each of the first electronic device 100-1 and the second electronic device 100-2 may exchange an image captured by a camera with each other, and may display the image in a display. During the video call, each of the first electronic device 100-1 and the second electronic device 100-2 may control a camera of a counterpart in response to a request of a user. Hereinafter, it is described that the first electronic device 100-1 controls a camera included in the second electronic device 100-2.

The user terminal device 200 may be connected with the first electronic device 100-1. The user terminal device 200 may be a smartphone or a wearable device (e.g., a smart watch, a smart band, or the like). The first user may control the first electronic device 100-1 by using the user terminal device 200. The first user may control the camera of the second electronic device 100-2 by using the user terminal device 200.

Figure 2A:
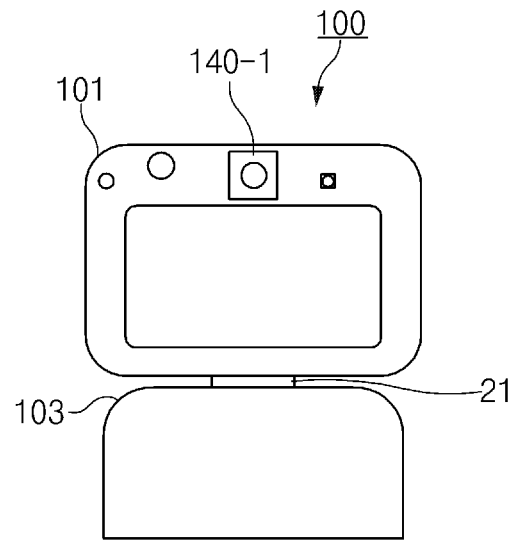
FIGS. 2A and 2B illustrate an electronic device, according to an embodiment of the present disclosure.
Figure 2B:
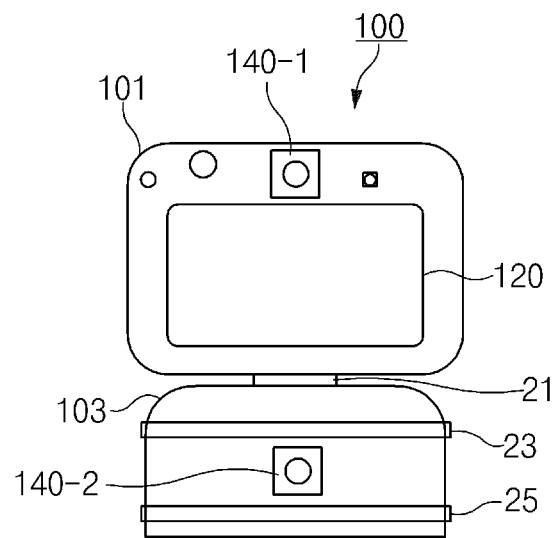

FIGS. 2A and 2B illustrate an electronic device, according to an embodiment of the present disclosure.

Referring to FIG. 2A, an electronic device 100 (e.g., the first electronic device 100-1 or the second electronic device 100-2) is provided. The electronic device 100 includes a first body 101 and a second body 103. The first body 101 and the second body 103 may be implemented with shapes corresponding to a head and a body of a person, respectively. The first body 101 and the second body 103 may be surrounded by a first housing and a second housing, respectively. The first body 101 includes a first camera 140-1. The first camera 140-1 may be exposed to the outside through the first housing. The electronic device 100 may control a capturing direction of the first camera 140-1 by moving the first body 101.

The first body 101 may move independently of the second body 103. The electronic device 100 includes a rotation member 21 between the first body 101 and the second body 103. The electronic device 100 may move the first body 101 by using the rotation member 21. For example, the electronic device 100 may rotate the first body 101 horizontally or vertically by using the rotation member 21. As another example, the electronic device 100 may move the first body 101 vertically by using the rotation member 21. Accordingly, the capturing direction of the first camera 140-1 included in the first body 101 may be changed.

Referring to FIG. 2B, the electronic device 100 is shown. The first body 101 additionally includes a display 120, and the second body 103 includes a second camera 140-2. The second camera 140-2 may be exposed to the outside through the second is housing. The electronic device 100 may control the capturing direction of the second camera 140-2 by moving the second body 103.

The second body 103 includes a first rotation plate 23 and a second rotation plate 25. The electronic device 100 may rotate at least a part of the first body 101 and the second body 103 leftward or rightward about the first rotation plane 23. Accordingly, the capturing direction of the first camera 140-1 included in the first body 101 may be changed. The electronic device 100 may rotate at least a part of the first body 101 and the second body 103 horizontally about the second rotation plate 25. Accordingly, the capturing direction of the first camera 140-1 included in the first body 101 and the capturing direction of the second camera 140-2 included in the second body 103 may be changed. The electronic device 100 may change only the capturing direction of the second camera 140-2 by rotating the first rotation plate 23 and the second rotation plate 25 in opposite directions at the same time. For example, the electronic device 100 may rotate elements on the second rotation plate 25 rightward and elements on the first rotation plate 23 leftward at the same time. Accordingly, the capturing direction of the second camera 140-2 may be rotated rightward without changing the capturing direction of the first camera 140-1.

The first body 101 and the second body 103 may be separated from each other. The first body 101 separated from the second body 103 may be implemented with a head mounted display (HMD) being mounted on a head of a user.

A lens for virtual reality (or augmented reality) may be mounted on the display 120 included in the first body 101.

Figure 3:
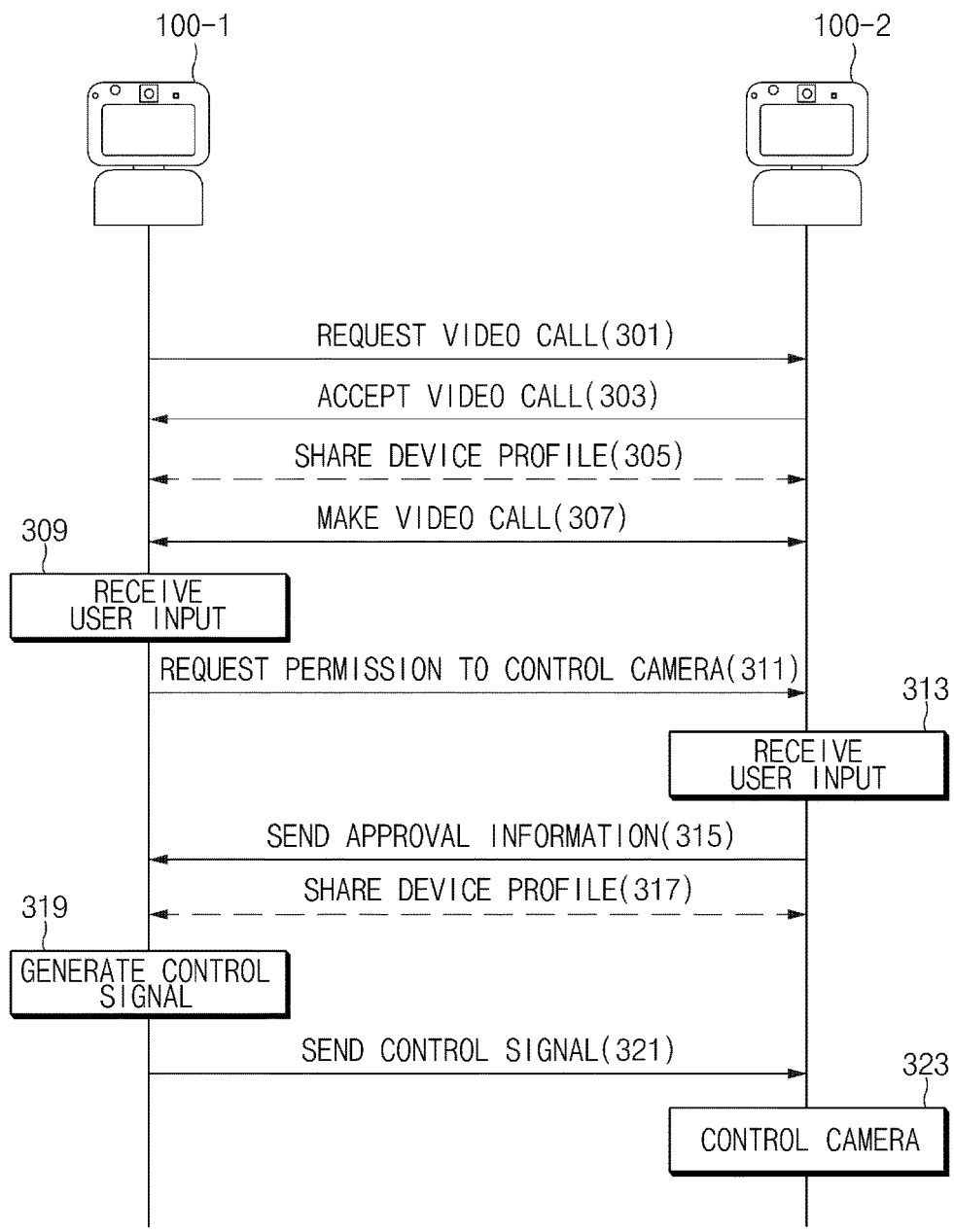
FIG. 3 is a signal flow diagram of a video call method of a video call system, according to an embodiment of the present disclosure.

FIG. 3 is a signal flow diagram of a video call method of a video call system, according to an embodiment of the present disclosure.

Referring to FIG. 3, a video call method between the first electronic device 100-1 and the second electronic device 100-2 is provided. The second electronic device 100-2 may include only the first camera 140-1.

At step 301, the first electronic device 100-1 requests a video call from the second electronic device 100-2 based on a user input. A first user of the first electronic device 100-1 may input a user command for the video call by using, for example, a touch, motion (i.e., a gesture), or a voice. The first user may directly input the user command to the first electronic device 100-1 or may input the user command through the user terminal device 200 connected with the first electronic device 100-1 or through a remote control device.

At step 303, the second electronic device 100-2 sends information about acceptance of the video call to the first electronic device 100-1. For example, if the video call is accepted by a second user of the second electronic device 100-2, the second electronic device 100-2 may send the information about acceptance of the video call to the first electronic device 100-1. The second user may accept the video call by using, for example, a touch, motion (i.e., a gesture), or a voice.

At step 305, the first electronic device 100-1 and the second electronic device 100-2 share a device profile. For example, if the video call is connected, each of the first electronic device 100-1 and the second electronic device 100-2 may send a device profile. The device profile may include information about whether a camera, a display, a speaker, a drive-capable part (or a movable part), and the like are included in the first electronic device 100-1 and the second electronic device 100-2. Step 305 may be omitted.

At step 307, the first electronic device 100-1 and the second electronic device 100-2 make the video call. If the video call starts, each of the first electronic device 100-1 and the second electronic device 100-2 may generate a video call session (or a video call channel) for sending or receiving data (e.g., image data or audio data) that is necessary for the video call. Each of the first electronic device 100-1 and the second electronic device 100-2 may recognize a user (or a face of the user) in an image captured by a camera and may track the recognized user. For example, each of the first electronic device 100-1 and the second electronic device 100-2 may track the user by changing a capturing direction of the camera based on motion of the user (or the face of the user). The first electronic device 100-1 may send the image that is captured by the camera, to the second electronic device 100-2 through the video call session. The second electronic device 100-2 may send the image that is captured by using the camera, to the first electronic device 100-1 through the video call session. Each of the first electronic device 100-1 and the second electronic device 100-2 may display the received image in a display. It has been described that the video call is made in response to a request of the first electronic device 100-1. However, the video call may be made in response to a request of the second electronic device 100-2.

At step 309, the first electronic device 100-1 receives a user input. For example, the first electronic device 100-1 may receive the user input for requesting permission to control a camera of the second electronic device 100-2.

At step 311, the first electronic device 100-1 requests permission to control the camera from second electronic device 100-2.

At step 313, the second electronic device 100-2 receives the user input. For example, the second electronic device 100-2 may receive the user input, from the second user of the second electronic device 100-2, for approving the request for permission to control the camera. The second user may input a user command for approving the request for the permission to control the camera by using a touch, motion (or a gesture), or a voice. The second user may directly input the user command to the second electronic device 100-2 or may input a user command through the user terminal device 200 connected with the second electronic device 100-2 or through the remote control device. If the user input for approving control of the camera is received, the second electronic device 100-2 may perform user authentication to determine whether the user input is a user input received from a legitimate user (or a user registered in advance). For example, is the second electronic device 100-2 may authenticate the user through biometric authentication using a face, an iris, a fingerprint, a voice, or the like. The second electronic device 100-2 may strengthen security by performing user authentication.

At step 315, the second electronic device 100-2 sends approval information about the request for permission to control to the first electronic device 100-1.

At step 317, the first electronic device 100-1 and the second electronic device 100-2 share a device profile. For example, if the request for permission to control the camera is approved, the first electronic device 100-1 and the second electronic device 100-2 may send each device profile. In the case where the device profile is shared in step 305, step 317 may be omitted.

Alternatively, when in step 305, the first device profile (e.g., including information about whether a camera, a display, a speaker, and a drive-capable part are included) is shared, then in step 317, a second device profile (e.g., including a ratio of zoom-in to zoom-out of the camera, brightness of the camera, focus of the camera, white balance of the camera, a resolution of the camera, a resolution of the display, brightness of the display, volume of the speaker, a rotation (or movement) direction of a drive-capable part, rotation radius, or the like), which is more detailed than the first device profile, may be shared.

At step 319, the first electronic device 100-1 generates a control signal. The first electronic device 100-1 may generate the control signal corresponding to a touch manipulation of a user. The first electronic device 100-1 may recognize a voice of the user and may generate the control signal corresponding to the voice of the user. The first electronic device 100-1 may recognize motion (i.e., a gesture) of the user and may generate the control signal corresponding to the motion of the user. The first electronic device 100-1 may track the first user (e.g., a face of the first user) by using an image captured by the camera and may generate the control signal corresponding to the change of the capturing direction of the camera based on the tracking of the user. The first electronic device 100-1 may detect motion of the first electronic device 100-1 and may generate the control signal corresponding to the motion of the first electronic device 100-1. If motion information of the user terminal device 200 is received from the user terminal device 200, the first electronic device 100-1 may generate the control signal corresponding to motion of the user terminal device 200. The first electronic device 100-1 may generate the control signal based on the device profile of the second electronic device 100-2. For example, the first electronic device 100-1 may verify a camera and a drive-capable as part of the second electronic device 100-2 and may generate the control signal for controlling the camera of the second electronic device 100-2 based on the verification.

At step 321, the first electronic device 100-1 sends the control signal to the second electronic device 100-2. The first electronic device 100-1 may send the control signal to the second electronic device 100-2 through the video call session. If approval information about the request for permission to control is received from the second electronic device 100-2, the first electronic device 100-1 may generate a control session (or a control channel) for sending the control signal to the second electronic device 100-2. The first electronic device 100-1 may send the control signal through the control session.

At step 323, the second electronic device 100-2 controls the camera based on the control signal received from the first electronic device 100-1. For example, the second electronic device 100-2 may change the capturing direction of the camera by moving at least a part of the first body 101 or the second body 103. As another example, the second electronic device 100-2 may change a capture location by moving a location of the second electronic device 100-2. As another example, the second electronic device 100-2 may change capture information (e.g., a resolution, brightness, zoom-in/out, focus, white balance, or the like) of the camera. The second electronic device 100-2 may send an image that is captured according to the control signal received from the first electronic device 100-1, to the first electronic device 100-1.

Figure 4:
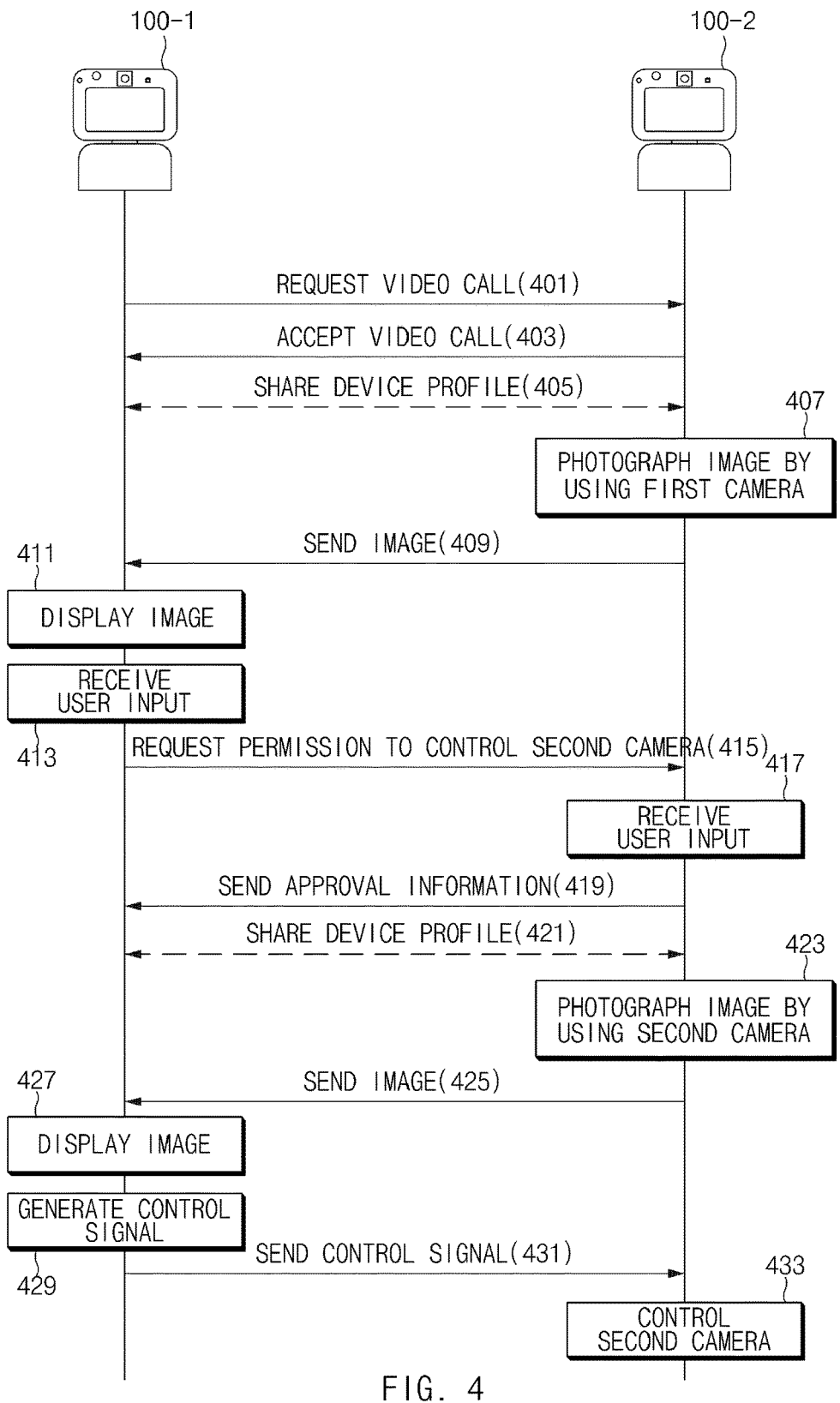
FIG. 4 is a signal flow diagram of a video call method of a video call system, according to an embodiment of the present disclosure.

FIG. 4 is a signal flow diagram of a video call method of a video call system, according to an embodiment of the present disclosure.

Referring to FIG. 4, a video call method between the first electronic device 100-1 and the second electronic device 100-2 is provided. The second electronic device 100-2 may be the electronic device 100 including the first camera 140-1 and the second camera 140-2).

At step 401, the first electronic device 100-1 request a video call from the second electronic device 100-2 based on a user input. A first user of the first electronic device 100-1 may input a user command for the video call by using, for example, a touch, motion (i.e., a gesture), or a voice.

At step 403, the second electronic device 100-2 sends information about acceptance of the video call to the first electronic device 100-1. For example, if the second user of the second electronic device 100-2 accepts the video call, the second electronic device 100-2 may send the information about the acceptance of the video call to the first electronic device 100-1. The second user may accept the video call by using, for example, a touch, motion (i.e., a gesture), or a voice.

At step 405, the first electronic device 100-1 and the second electronic device 100-2 share a device profile. For example, if the video call is connected, each of the first electronic device 100-1 and the second electronic device 100-2 may send each device profile. The device profile may include information about whether a camera, a display, a drive-capable part (or a movable part) of a body, and the like are included in the first electronic device 100-1 and the second electronic device 100-2. Step 405 may be omitted.

If the video call is accepted, the first electronic device 100-1 and the second is electronic device 100-2 may make the video call. If the video call starts, the first electronic device 100-1 and the second electronic device 100-2 may generate a video call session for sending or receiving data (e.g., image data or audio data) that is necessary for the video call.

At step 407, if the video call starts, the second electronic device 100-2 captures an image by using the first camera 140-1. The second electronic device 100-2 may recognize a user (or a face of the user) in the captured image and may track the recognized user. For example, the second electronic device 100-2 may track the user by changing a capturing direction of the first camera 140-1 based on motion of the user (or the face of the user).

At step 409, the second electronic device 100-2 sends the image that is captured by the first camera 140-1, to the first electronic device 100-1.

At step 411, the first electronic device 100-1 displays the received image in a display of the first electronic device 100-1.

It has been described that the video call is made in response to a request of the first electronic device 100-1. However, the video call may be made in response to a request of the second electronic device 100-2.

At step 413, the first electronic device 100-1 receives a user input. For example, the first electronic device 100-1 may receive a user input for requesting for control of at least one (e.g., the second camera) of a plurality of cameras included in the second electronic device 100-2.

At step 415, the first electronic device 100-1 requests permission to control at least one of the plurality of cameras, such as the second camera 140-2, which is included in the second electronic device 100-2, from the second electronic device 100-2.

At step 417, the second electronic device 100-2 receives a user input. For example, the second electronic device 100-2 may receive a user input, from the second user of the second electronic device 100-2, for approving the request for permission to control a second camera 140-2. The second user may input a user command for accepting the request for permission to control the second camera 140-2 by using a touch, motion (i.e., a gesture), or a voice. The second user may directly input the user command to the second electronic device 100-2 or may input a user command through the user terminal device 200 connected with the second electronic device 100-2 or through a remote control device. If the user input for approving control of the second camera 140-2 is received, the second electronic device 100-2 may perform user authentication to determine whether the user input is a user input received from a legitimate user. For example, the second electronic device 100-2 may authenticate the user through biometric authentication using a face, an iris, a fingerprint, a voice, or the like. As another example, the second electronic device 100-2 may request an input such as a password, a touch pattern, a gesture, or the like.

At step 419, the second electronic device 100-2 sends approval information about the request for permission to control the second camera 140-2 to the first electronic device 100-1.

At step 421, the first electronic device 100-1 and the second electronic device 100-2 share a device profile. For example, if the request for permission to control the second camera 140-2 is approved, each of the first electronic device 100-1 and the second electronic device 100-2 may send each device profile. In the case where the device profile is shared in step 405, step 421 may be omitted.

Alternatively, when in step 405, the first device profile (e.g., including information about whether a camera, a display, a speaker, and a drive-capable part are included) is shared, then in step 421, a second device profile (e.g., including a ratio of zoom-in to zoom-out of the camera, brightness of the camera, focus of the camera, white balance of the camera, a resolution of the camera, a resolution of the display, brightness of the display, volume of the speaker, a rotation (or movement) direction of a drive-capable part, rotation radius, or the like), which is more detailed than the first device profile, may be shared.

At step 423, if the user input for approving the request for permission to control is received, the second electronic device 100-2 may capture an image by using the second camera 140-2, of which the permission to control is requested. If the user input for approving the request for permission to control the second camera 140-2 is received, the second electronic device 100-2 may capture an image by using the second camera 140-2 after changing a capturing direction of the second camera 140-2 into a capturing direction of the first camera 140-1. If the second camera 140-2 starts to capture an image, the second electronic device 100-2 may stop the capturing by the first camera 140-1. Alternatively, the second electronic device 100-2 may capture an image by using both the first camera 140-1 and the second camera 140-2, without stopping the capturing of the first camera 140-1.

At step 425, the second electronic device 100-2 sends the image that is captured by the second camera 140-2, to the first electronic device 100-1. For example, the second electronic device 100-2 may send only the image that is captured by the second camera, to the first electronic device 100-1. As another example, the second electronic device 100-2 may send the image captured by the first camera together with the image captured by the second camera.

At step 427, the first electronic device 100-1 displays the received image in the display of the first electronic device 100-1. If a plurality of images (e.g., the image captured by the first camera 140-1 and the image captured by the second camera 140-2) are received from the second electronic device 100-2, the first electronic device 100-1 may display at least a part of the plurality of images in the display.

At step 429, the first electronic device 100-1 generates a control signal. In the case where the first electronic device 100-1 has permission to control the plurality of cameras included in the second electronic device 100-2, the user may select at least one of the plurality of cameras, and the first electronic device 100-1 may generate the control signal associated with the selected camera.

The first electronic device 100-1 may generate the control signal corresponding to a touch manipulation of a user. The first electronic device 100-1 may recognize a voice of the user and may generate the control signal corresponding to the voice of the user. The first electronic device 100-1 may recognize motion (i.e., a gesture) of the user and may generate the control signal corresponding to the motion of the user. The first electronic device 100-1 may track the first user by using an image captured by a camera and may generate the control signal corresponding to a change of the capturing direction of the camera based on the tracking of the user. The first electronic device 100-1 may detect motion of the first electronic device 100-1 and may generate the control signal corresponding to the motion of the first electronic device 100-1. If motion information of the user terminal device 200 is received from the user terminal device 200, the first electronic device 100-1 may generate the control signal corresponding to motion of the user terminal device 200. The first electronic device 100-1 may generate the control signal based on the device profile of the second electronic device 100-2. For example, the first electronic device 100-1 may verify information about a camera and a drive-capable part of the second electronic device 100-2 and may generate the control signal for controlling the camera of the second electronic device 100-2 based on the verified result.

At step 431, the first electronic device 100-1 sends the control signal to the second electronic device 100-2. The first electronic device 100-1 may send the control signal to the second electronic device 100-2 through the video call session. If approval information about the request for permission to control is received from the second electronic device 100-2, the first electronic device 100-1 may generate a control session for sending or receiving the control signal to or from the second electronic device 100-2. The first electronic device 100-1 may send the control signal through the control session.

At step 433, the second electronic device 100-2 controls the second camera 140-2 based on the control signal received from the first electronic device 100-1. For example, the second electronic device 100-2 may change the capturing direction of the second camera 140-2 by moving at least a part of the first body 101 and the second body 103. As another example, the second electronic device 100-2 may change a capture location of the second camera 140-2 by moving a location of the second electronic device 100-2. As another example, the second electronic device 100-2 may change capture information (e.g., a resolution, brightness, zoom in/out, focus, white balance, or the like) of the second camera 140-2. The second electronic device 100-2 may send an image that is captured according to the control signal received from the first electronic device 100-1, to the first electronic device 100-1.

The first electronic device 100-1 may have permission to control the plurality of cameras included in the second electronic device 100-2. If a user input for changing a camera (or a camera generating the control signal) to be controlled is received, the first electronic device 100-1 may generate the control signal for controlling the changed camera. If a user input for canceling the permission to control at least one of the plurality of cameras is received, the first electronic device 100-1 may send a message requesting cancelation of the permission to control the at least one of the plurality of cameras to the second electronic device 100-2. If a user input for matching capturing directions of the plurality of cameras with each other is received, the first electronic device 100-1 may generate the control signal for matching capturing directions of the plurality of cameras with a specific direction.

The first electronic device 100-1 may have the permission to control one of the plurality of cameras included in the second electronic device 100-2. If a user input for changing a camera that is being controlled is received, the first electronic device 100-1 may send a message for requesting permission to control another camera.

Figure 5A:
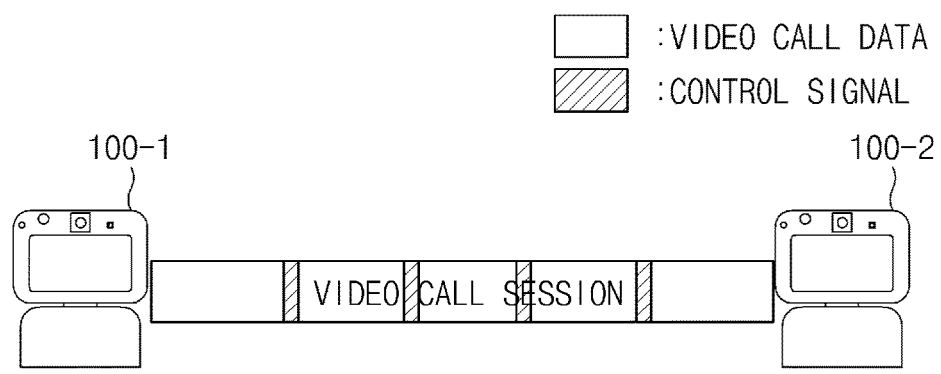
FIGS. 5A and 5B illustrate a transmission path of a control signal, according to an embodiment of the present disclosure.
Figure 5B:
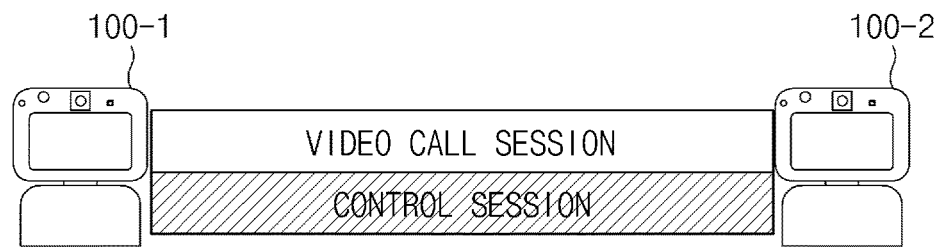

FIGS. 5A and 5B illustrate a transmission path of a control signal, according to an embodiment of the present disclosure.

Referring to FIGS. 5A and 5B, a transmission path of a control signal between the first electronic device 100-1 and the second electronic device 100-2 is described If a video call starts, each of the first electronic device 100-1 and the second electronic device 100-2 may generate a video call session for sending or receiving data (e.g., image data or audio data) that is necessary for the video call. As shown in FIG. 5A, the first electronic device 100-1 may send the control signal to the second electronic device 100-2 through the video call session. For example, the first electronic device 100-1 may insert the control signal in a transmission packet for transmitting video call data. For example, the first electronic device 100-1 may insert the control signal in a reserved area of the transmission packet.

If approval information about a request for permission to control a camera is received from the second electronic device 100-2, the first electronic device 100-1 may generate a control session for sending or receiving the control signal to or from the second electronic device 100-2. As shown in FIG. 5B, the first electronic device 100-1 may send the control signal through the control session.

Figure 6:
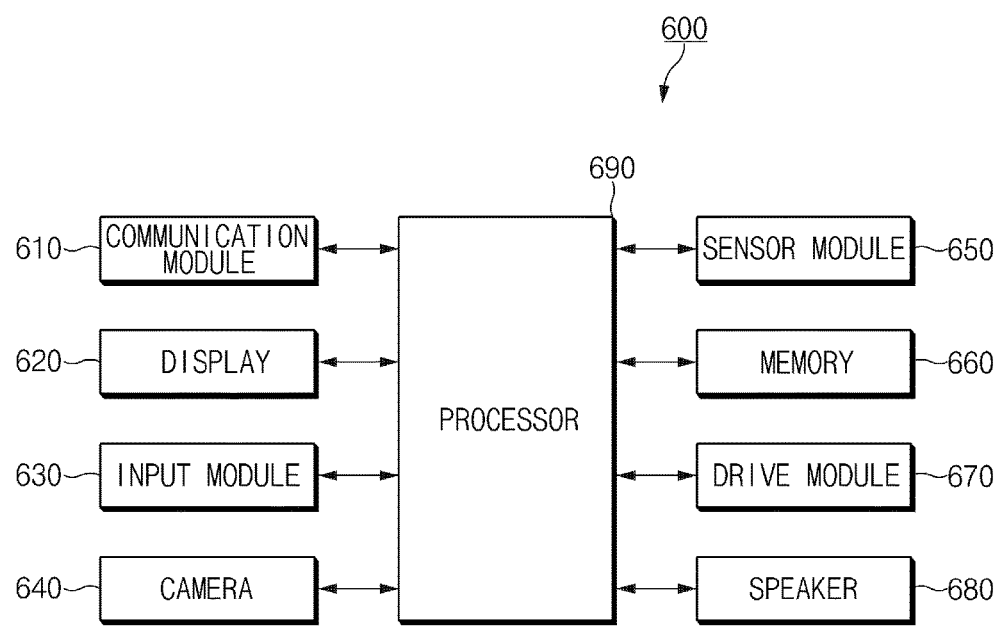
FIG. 6 is a block diagram of a configuration of an electronic device, according to an embodiment of the present disclosure.

FIG. 6 is a block diagram of a configuration of an electronic device, according to an embodiment of the present disclosure.

Referring to FIG. 6, an electronic device 600 is provided. The electronic device 600 may operate as the first electronic device 100-1 or the second electronic device 100-2 depending on the situation. However, it is described that the electronic device 600 operates as the first electronic device 100-1.

The electronic device 600 includes a communication module 610, a display 620, an input module 630, a camera 640, a sensor module 650, a memory 660, a drive module 670, a speaker 680, and a processor 690.

The communication module 610 (or a communication circuit) may communicate with an external electronic device (e.g., the second electronic device 100-2 or the user terminal device 200). The communication module 610 may send or receive video call data (e.g., image data or voice data) to or from the external electronic device. The communication module 610 may share a device profile with the external electronic device. The communication module 610 may request permission to control a camera, which is included in the external electronic device, from the external electronic device. The communication module 610 may send a control signal for controlling the camera included in the external electronic device.

The communication module 610 may include a radio frequency (RF) module, a cellular module, a Wi-Fi module, a Bluetooth module, a global navigation satellite system (GNSS) module, or a near field communication (NFC) module. The electronic device 600 may be connected to a network (e.g., an Internet network or a movement communication network) through at least one of the above-mentioned modules and may communicate with the external electronic device. For example, the electronic device 600 may communicate with the second electronic device 100-2 by using the RF module, the Wi-Fi module, or the cellular module. As another example, the electronic device 600 may communicate with the user terminal device 200 by using the Bluetooth module or the NFC module.

The display 620 may display content (e.g., an image). The display 620 may display an image captured by the camera 640. The display 620 may display the image received from the external electronic device. The display 620 may display an object (e.g., a text, an icon, or the like) indicating that permission to control the camera included in the external electronic device is capable of being requested. The display 620 may display an object indicating that the camera included in the external electronic device is being is controlled.

The input module 630 (or a user interface) may receive (or sense) a user input. The input module 630 may include a touch sensor panel that senses a touch manipulation of a user or a pen sensor panel (e.g., a digitizer) that senses a pen manipulation of the user. The input module 630 may include a motion recognition sensor that recognizes the motion (i.e., a gesture) of the user or a voice recognition sensor that recognizes the voice of the user. The voice recognition sensor may include a microphone that receives the voice of the user. The display 620 and the input module 630 may be implemented with a touch screen that is capable of displaying and sensing the touch manipulation at the same time. In the touch screen, an input panel may be disposed on the display panel. At least a part (e.g., a touch panel or a touch screen) of the input module 630 may be physically separated from the electronic device 600. For example, at least a part of the input module 630 may be implemented with a remote control device connected with the electronic device 600 through wireless communication.

The camera 640 may capture an image. For example, the camera 640 may capture an image in a specific direction. The camera 640 may be exposed to the outside through a housing.

The sensor module 650 may sense a state of the electronic device 600. For example, the sensor module 650 may include a motion sensor (e.g., an acceleration sensor, a gyro sensor, or the like) that senses motion of the electronic device 600.

The memory 660 may store a device profile of the electronic device 600. If the device profile of the external electronic device is received, the memory 660 may store the device profile of the external electronic device. The device profile may include information about whether a camera, a display, a speaker, and a drive-capable part (or a movable part) are included in the electronic device 600 and the external electronic device, a ratio of zoom-in to zoom-out of a camera, brightness of the camera, focus of the camera, white balance of the camera, a resolution of the camera, a resolution of a display, brightness of the display, volume of a speaker, a rotation (or movement) direction of a drive-capable part, a rotation radius, or the like.

The drive module 670 may mechanically drive the electronic device 600. The drive module 670 may include at least one motor connected with a body of the electronic device 600. For example, the drive module 670 may rotate or move at least a part of the body of the electronic device 600 by using at least one motor.

The speaker 680 may output various pieces of information associated with the electronic device 600 by using sound or a voice. For example, if the electronic device 600 obtains permission to control at least one camera included in the external electronic device, the speaker 680 may output a voice for providing notification that at least one camera included in the external electronic device is capable of being controlled.

The processor 690 (e.g., an application processor) may control overall operations of the electronic device 600. The processor 690 may control each of the communication module 610, the display 620, the input module 630, the camera 640, the sensor module 650, the memory 660, the drive module 670, and the speaker 680 to make a video call. The processor 690 may be implemented with a system on chip (SoC) including a central processing unit (CPU), a graphic processing unit (GPU), a memory, and the like.

The processor 690 may make the video call with the external electronic device. For example, the processor 690 may request the video call from the external electronic device based on a user input. If the video call is accepted by the external electronic device, the processor 690 may start the video call with the external electronic device. As another example, the processor 690 may start the video call with the external electronic device by accepting the request for the video call received from the external electronic device. If the video call starts, the processor 690 may send an image captured by the camera 640 to the external electronic device and may display the image received from the external electronic device in the display 620. If a plurality of images (e.g., images captured by a plurality of cameras) are received from the external electronic device, the processor 690 may display the plurality of images in different areas of the display 620.

The processor 690 may make the video call with a plurality of external electronic devices (e.g., a plurality of second electronic devices 100-2). The processor 690 may display the plurality of images, which are respectively received from the plurality of external electronic devices, in the display 620.

If the video call starts, the processor 690 may generate a video call session for sending or receiving data (e.g., image data or audio data), which is necessary for the video call, to or from the external electronic device.

The processor 690 may track the user based on the image captured by the camera 640. For example, the processor 690 may recognize the user (or a face of the user) by using the image captured by the camera 640. The processor 690 may recognize the user by using, for example, a face recognition algorithm. The processor 690 may change a capturing direction of the camera 640 based on a location (or motion) of the recognized user. For example, the processor 690 may control the drive module 670 to change the capturing direction of the camera 640.

The processor 690 may receive a user input for requesting permission to control at least one camera, which is included in the external electronic device, through the input module 630. For example, the user may input a user command for requesting permission to control the camera in the external electronic device by using a touch, motion (i.e., a gesture), or a voice.

The processor 690 may request permission to control at least one camera in the external electronic device from the external electronic device through the communication module 610. If approval information about the request for permission to control at least one camera is received from the external electronic device, the electronic device 600 may is have the permission to control the camera included in the external electronic device.

In the case where the electronic device 600 makes the video call with a plurality of the external electronic devices, the user may select one of images which correspond to the plurality of the external electronic devices and which are displayed in the display 620, and the electronic device 600 may request permission to control the camera from an external electronic device corresponding to the image selected by the user.

The processor 690 may generate the control signal for controlling a capturing direction of at least one camera included in the external electronic device. Hereinafter, various methods in which the processor 690 generates the control signal are described with reference to FIGS. 7 to 10.

Figure 7:
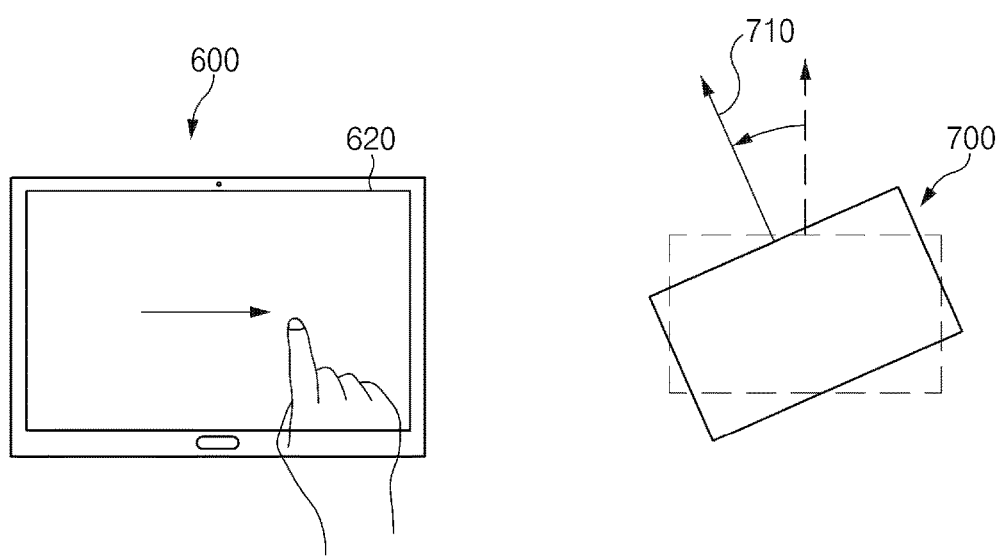
FIG. 7 illustrates a method of generating a control signal, according to an embodiment of the present disclosure.

FIG. 7 illustrates a method of generating a control signal, according to an embodiment of the present disclosure.

Referring to FIG. 7, the electronic device 600 and an external electronic device 700 are provided. The processor 690 of the electronic device 600 may generate a control signal corresponding to a touch manipulation of a user that is input to the input module 630 (e.g., a touch panel or a touch screen). The processor 690 may generate the control signal for rotating a capturing direction of a camera included in the external electronic device 700 in a direction opposite to a direction of the touch manipulation of the user. For example, the user may input a rightward touch manipulation (e.g., flip or swipe) on the display 620 (or the touch screen) of the electronic device 600. If the rightward touch manipulation is input from the user, the control signal for rotating a capturing direction 710 of the camera in the external electronic device 700 leftward may be generated. As another example, if an upward touch manipulation is input, the control signal for rotating the capturing direction of the camera in the external electronic device 700 downward may be generated.

The processor 690 may generate the control signal such that a variation in the is capturing direction of the camera included in the external electronic device 700 is proportional to a speed or a movement distance of the touch manipulation of the user. For example, as the speed or the movement distance of the touch manipulation of the user increases, the variation in the capturing direction of the camera included in the external electronic device 700 may increase.

The processor 690 may generate the control signal indicating a zoom-in or zoom-out operation based on the touch manipulation of the user. For example, if a zoom-in manipulation (e.g., a touch manipulation where a gap between two touch points increases) is input from the user, the processor 690 may generate the control signal that instructs the camera included in the external electronic device 700 to perform the zoom-in operation. As another example, if a zoom-out manipulation (e.g., a touch manipulation where a gap between two touch points decreases) is input from the user, the processor 690 may generate the control signal that instructs the camera included in the external electronic device 700 to perform the zoom-out operation.

Figure 8:
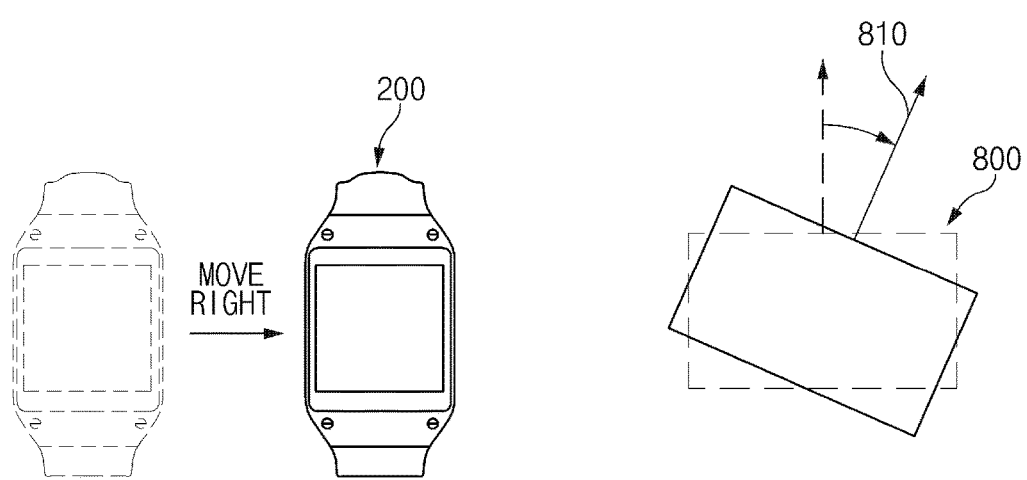
FIG. 8 illustrates a method of generating a control signal, according to an embodiment of the present disclosure.

FIG. 8 illustrates a method of generating a control signal, according to an embodiment of the present disclosure.

Referring to FIG. 8, a user terminal 200 and an external electronic device 800 are provided. The processor 690 of the electronic device 600 may generate a control signal corresponding to the motion of the user terminal device 200 connected through the communication module 610 (e.g., a Bluetooth module) to the electronic device 600. The processor 690 may receive motion information of the user terminal device 200 from the user terminal device 200 and generate the control signal for rotating a capturing direction of a camera included in the external electronic device 800 in the same direction as a motion direction of the user terminal device 200 based on the received motion information. For example, if the user terminal device 200 moves rightward by a user, the control signal for rotating the capturing direction 810 of the camera included in the is external electronic device 800 rightward may be generated. As another example, if the user terminal device 200 moves downward, the control signal for rotating the capturing direction of the camera included in the external electronic device 800 downward may be generated.

The processor 690 may generate the control signal such that a variation in the capturing direction of the camera included in the external electronic device 800 is proportional to a speed or a movement distance of the user terminal device 200. For example, as the speed or the movement distance of the user terminal device 200 increases, the variation in the capture direction of the camera included in the external electronic device 800 may increase.

The processor 690 may generate a control signal indicating a zoom-in or zoom-out operation based on motion of the user terminal device 200. For example, if the user terminal device 200 approaches the electronic device 600, the processor 690 may generate the control signal that instructs the camera included in the external electronic device 800 to perform the zoom-in operation. As another example, if the user terminal device 200 is away from the electronic device 600, the processor 690 may generate the control signal that instructs the camera included in the external electronic device 800 to perform the zoom-out operation.

Figure 9:
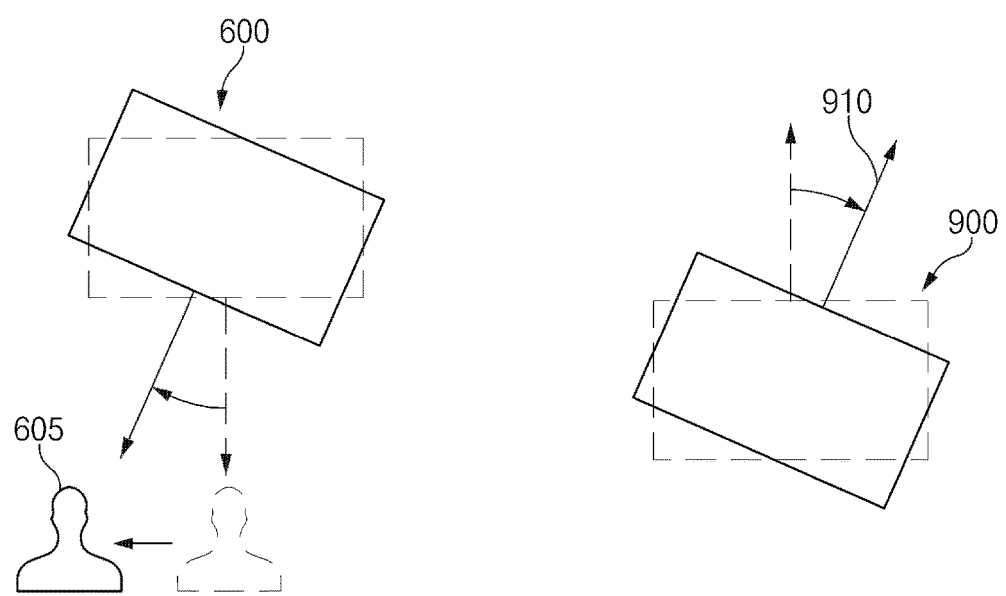
FIG. 9 illustrates a method of generating a control signal, according to an embodiment of the present disclosure.

FIG. 9 illustrates a method of generating a control signal, according to an embodiment of the present disclosure.

Referring to FIG. 9, an electronic device 600, a user 605, and an external electronic device 900 are provided. The processor 690 of the electronic device 600 may generate a control signal corresponding to motion of the user 605. The processor 690 may track a user 605 (or a face of the user 605) by using an image captured by the camera 640 included in the electronic device 600. The processor 690 may change a capturing direction of the camera 640 based on the tracking of a user 605 and may generate the is control signal corresponding to a change in the capturing direction of the camera 640. The processor 690 may generate the control signal for rotating the capturing direction of the camera 640 included in the external electronic device 900 in the same direction as a rotation direction of the camera 640 included in the electronic device 600. For example, in a state where the user 605 faces the electronic device 600 (with respect to the user 605), the user 605 may move in the left direction of the electronic device 600. If the user 605 moves in a left direction of the electronic device 600, the processor 690 may rotate a capturing direction of the camera 640 included in the electronic device 600 rightward so as to track the user 605. The processor 690 may generate the control signal for rotating a capturing direction 910 of the camera included in the external electronic device 900 rightward to correspond to a rotation direction of the camera 640. As another example, if the user 605 moves in the right direction of the electronic device 600 in a state where the user 605 faces the electronic device 600 (with respect to the user 605), the processor 690 may rotate a capturing direction of the camera 640 leftward so as to track the user 605. The processor 690 may generate the control signal for rotating the capturing direction of the camera included in the external electronic device 900 leftward to correspond to a rotation direction of the camera 640.

The processor 690 may generate the control signal such that a variation in the capturing direction is proportional to a variation in the capturing direction that is based on movement of the user 605. For example, as the variation in the capturing direction (or an amount of rotation) that is based on the movement of the user 605 increases, the variation in the capturing direction of the camera included in the external electronic device 900 may increase.

The processor 690 may generate a control signal indicating a zoom-in or zoom-out operation based on the movement of the user 605. For example, if the user 605 approaches the electronic device 600, the processor 690 may generate the control signal is that instructs the camera included in the external electronic device 900 to perform the zoom-in operation. As another example, if the user 605 is away from the electronic device 600, the processor 690 may generate the control signal that instructs the camera included in the external electronic device 900 to perform the zoom-out operation.

Figure 10:
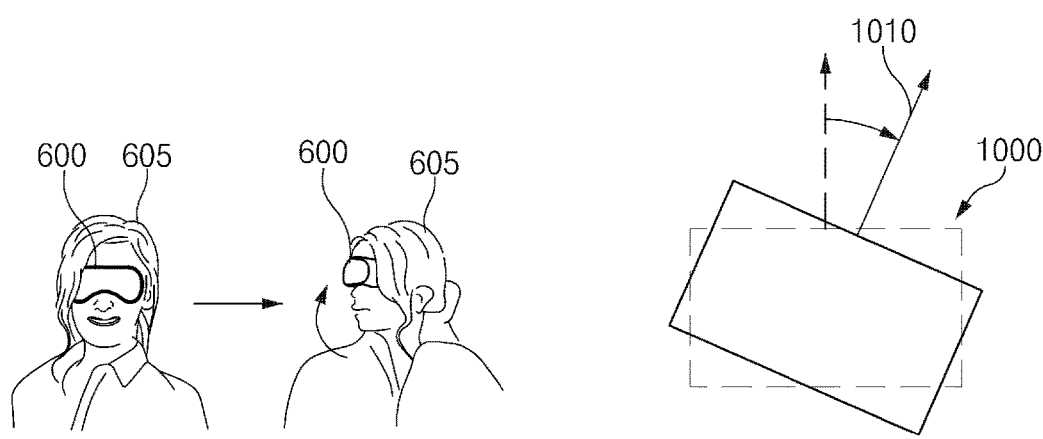
FIG. 10 illustrates a method of generating a control signal, according to an embodiment of the present disclosure.

FIG. 10 illustrates a method of generating a control signal, according to an embodiment of the present disclosure.

Referring to FIG. 10, the electronic device 600, the user 605, and an external electronic device 1000 are provided. The processor 690 of the electronic device 600 may generate a control signal for controlling a camera in the external electronic device 1000, based on motion of the electronic device 600. At least a part of the electronic device 600 may be implemented with a HMD being mounted on a head of the user 605. If the motion of the electronic device 600 is sensed by the sensor module 650, the processor 690 may generate the control signal for rotating a capturing direction of the camera in the external electronic device 1000 in the same direction as a motion direction (or a rotation direction) of the electronic device 600. For example, the user 605 may rotate his/her head rightward while mounting the electronic device 600. If the user 605 rotates his/her head rightward, the control signal for rotating a capturing direction 1010 of the camera included in the external electronic device 1000 rightward may be generated. As another example, if the user 605 moves his/her head downward, the control signal for rotating the capturing direction of the camera included in the external electronic device 1000 downward may be generated.

The processor 690 may generate the control signal such that a variation in the capturing direction of the camera included in the external electronic device 1000 is proportional to an amount of rotation of the electronic device 600 based on the movement of the user's 605 head. For example, as the amount of rotation of the electronic device 600 increases, the variation in the capturing direction of the camera included in the external electronic device 1000 may increase.

The processor 690 may generate the control signal corresponding to a voice recognized by the voice recognition sensor of the input module 630. The processor 690 may recognize the motion (i.e., a gesture) of a portion of the body of a user 605 (e.g., an arm) recognized by the motion recognition module of the input module 630 and may generate the control signal corresponding to the movement of a portion of the body of the user 605.

The processor 690 may send the generated control signal to the external electronic device 1000 through the communication module 610. The processor 690 may send the control signal to the external electronic device 1000 through a video call session. If approval information about a request for permission to control the camera of the external electronic device 1000 is received from the external electronic device 1000, the processor 690 may generate the control session for sending the control signal to the external electronic device 1000. The processor 690 may send the control signal through the control session.

Figure 11A:
FIGS. 11A to 11C illustrate a display screen of an electronic device, according to an embodiment of the present disclosure.
Figure 11B:
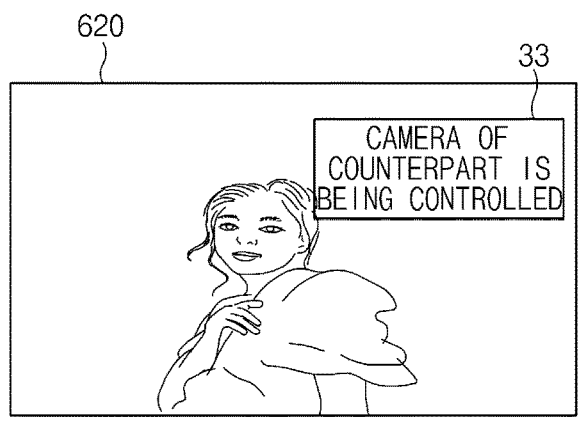
Figure 11C:
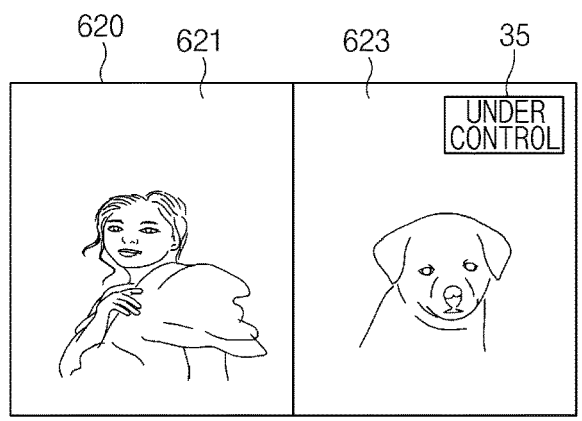

FIGS. 11A to 11C illustrate a display screen of an electronic device, according to an embodiment of the present disclosure.

Referring to FIGS. 11A to 11C, a display screen of the electronic device 600 is shown. If a video call with an external electronic device is made, the processor 690 of the electronic device 600 may display, in the display 620, a text indicating that permission to control a camera included in the external electronic device is requested. For example, the processor 690 may display an object (e.g., a text, an icon, or the like) indicating that permission to control is requested, may change a color of a display screen, or may allow the display screen to flicker. For example, as shown in FIG. 11A, a text object 31, such as "request control of a camera of counterpart", may be displayed in the display 620.

If approval information about the request for permission to control a camera included in the external electronic device is received from the external electronic device, the processor 690 may indicate, in the display 620 that a camera included in the external electronic device is under control. For example, the processor 690 may display an object indicating that the camera is controlled, may change a color of a display screen, or may allow the display screen to flicker. For example, as shown in FIG. 11B, a text object 33, such as "a camera of counterpart is being controlled", may be displayed in the display 620.

If a plurality of images captured by a plurality of cameras are received from the external electronic device, the processor 690 may display the plurality of images in the display 620. As shown in FIG. 11C, the processor 690 may display a first image in a first area 621 of the display 620 and may display a second image in a second area 623 of the display 620. The processor 690 may display a text object 35, such as "under control", in the second area 623, in which an image captured by a camera being controlled is displayed, indicating that the camera is being controlled.

If a video call between the electronic device 600 and the external electronic device is ended, the processor 690 may lose permission to control the camera included in the external electronic device. The processor 690 may lose permission to control the camera included in the external electronic device, based on a user input received to the input module 630. For example, the user of the electronic device 600 may input a user command for giving up permission to control the camera by using a touch, motion (i.e., a gesture), or a voice. The processor 690 may lose the permission to control the camera included in the external electronic device, based on a command for canceling permission to control the camera, which is received from the external electronic device through the communication module 610.

Figure 12:
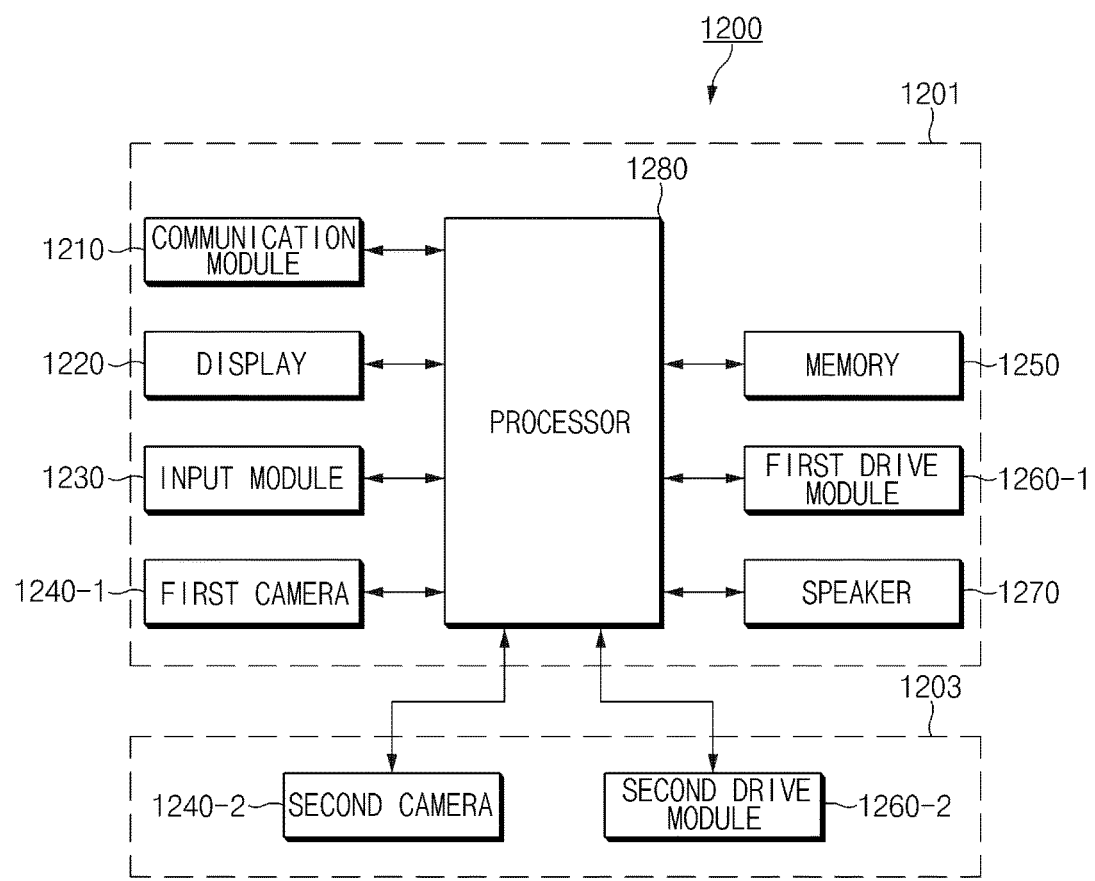
FIG. 12 is a block diagram of a configuration of an electronic device, according to an embodiment of the present disclosure.

FIG. 12 is a block diagram of a configuration of an electronic device, according to an embodiment of the present disclosure.

Referring to FIG. 12, an electronic device 1200 is provided. The electronic device 1200 may correspond to the electronic device 100. The electronic device 1200 may operate as the first electronic device 100-1 or the second electronic device 100-2 illustrated in FIG. 1 depending on the situation. However, it is described that the electronic device 1200 operates as the second electronic device 100-2.

The electronic device 1200 may include a first body 1201 and a second body 1203. The first body 1201 includes a communication module 1210, a display 1220, an input module 1230, a first camera 1240-1, a memory 1250, a first drive module 1260-1, a speaker 1270, and a processor 1280. The second body 1203 includes a second camera 1240-2 and a second drive module 1260-2. At least some of elements included in the first body 1201 may be included in the second body 1203, or at least some of elements included in the second body 1203 may be included in the first body 1201.

The communication module 1210 (or a communication circuit) may communicate with an external electronic device (e.g., the first electronic device 100-1). The communication module 1210 may send or receive video call data (e.g., image data or voice data) to or from the external electronic device. The communication module 1210 may send a device profile of the electronic device 1200 to the external electronic device. The communication module 1210 may receive a control signal for controlling at least one of the first camera 1240-1 and the second camera 1240-2 from the external electronic device.

The communication module 1210 may include a radio frequency (RF) module, a cellular module, a Wi-Fi module, a Bluetooth module, a global navigation satellite system (GNSS) module, or a near field communication (NFC) module. The electronic device 1200 may be connected to a network (e.g., an Internet network or a movement communication network) through at least one of the above-mentioned modules and may communicate with the external electronic device. For example, the electronic device 1200 may communicate with the external electronic device by using the RF module, the Wi-Fi module, or the cellular module.

The display 1220 may display content (e.g., an image). The display 1220 may display an image that is captured by the first camera 1240-1 or the second camera 1240-2. The display 1220 may display the image received from the external electronic device. The display 1220 may display an object (e.g., a text, an icon, or the like) indicating that the first camera 1240-1 or the second camera 1240-2 is controlled by the external electronic device.

The input module 1230 (or a user interface) may receive (or sense) a user input. The input module 1230 may include a touch sensor panel that senses a touch manipulation of a user or a pen sensor panel (e.g., digitizer) that senses a pen manipulation of a user. The input module 1230 may include a motion recognition sensor that recognizes the motion (or a gesture) of a user or a voice recognition sensor that recognizes the voice of a user. The voice recognition sensor may include, for example, a speaker that outputs the voice of the user. The display 1220 and the input module 1230 may be implemented with a touch screen that is capable of displaying and sensing the touch manipulation at the same time. In the touch screen, an input panel may be disposed on the display panel. At least a part (e.g., a touch panel or a touch screen) of the input module 1230 may be physically separated from the electronic device 1200. For example, at least a part of the input module 1230 may be implemented with a remote control device connected with the electronic device 1200 through wireless communication.

Each of the first camera 1240-1 and the second camera 1240-2 may capture an image. For example, each of the first camera 1240-1 and the second camera 1240-2 may capture an image in a specific direction. Each of the first camera 1240-1 and the second camera 1240-2 may be exposed to the outside through a housing.

The memory 1250 may store a device profile of the electronic device 1200. The memory 1250 may store a device profile of the external electronic device. The device profile may include information about, for example, whether a camera, a display, a speaker, and a drive-capable part (or a movable part) is included in the electronic device 1200 and the external electronic device, a ratio of zoom-in to zoom-out of a camera, brightness of the camera, focus of the camera, white balance of the camera, a resolution of the camera, a resolution of a display, brightness of the display, volume of a speaker, a rotation (or movement) direction of a drive-capable part, a rotation radius, or the like.

Each of the first drive module 1260-1 and the second drive module 1260-2 may mechanically drive the electronic device 1200. Each of the first drive module 1260-1 and the second drive module 1260-2 may include at least one motor connected with the first body 1201 and the second body 1203, respectively. For example, the first drive module 1260-1 may rotate or move at least a part of the first body 1201 by using the at least one motor. As another example, the second drive module 1260-2 may rotate or move at least a part of the second body 1203 by using the at least one motor.

The speaker 1270 may output various pieces of information associated with the electronic device 1200 by using sound or a voice. For example, if permission to control at least one camera is requested from the external electronic device, the speaker 1270 may output a voice for providing a notification that permission to control is requested.

The processor 1280 may control overall operations of the electronic device 1200. The processor 1280 may control each of the communication module 1210, the display 1220, the input module 1230, first and second cameras 1240-1 and 1240-2, the memory 1250, first and second drive modules 1260-1 and 1260-2, and the speaker 1270 to make a video call. The processor 1280 may be implemented with SoC, including a CPU, a GPU, a memory, and the like.

The processor 1280 may make the video call with the external electronic device. For example, the processor 1280 may request the video call from the external electronic device based on a user input. If the video call is accepted by the external electronic device, the processor 1280 may start making the video call with the external electronic device. As another example, the processor 1280 may start the video call with the external electronic device by accepting a request for the video call received from the external electronic device. The processor 1280 may receive a user input for accepting the request for the video call through the input module 1230. The second user of the electronic device 1200 may accept the video call by using, for example, a touch, motion (i.e., a gesture), or a voice. If the user input is received, the processor 1280 may send the information about acceptance of the video call to the external electronic device and may start the video call with the external electronic device. If the video call starts, the processor 1280 may send an image captured by the first camera 1240-1 to the external electronic device and may display the image, which is received from the external electronic device, in the display 1220.

The processor 1280 may track the user based on at least a part of information captured by the first camera 1240-1 or voice information recognized through the input module 1230. For example, the processor 1280 may recognize the user (or the face of the user) by using the image captured by the first camera 1240-1. The processor 1280 may recognize the user by using, for example, a face recognition algorithm. As another example, the processor 1280 may analyze the voice of the user recognized through a voice recognition sensor of the input module 1230 and may track a location of a speaker (e.g., the user) based on the analyzed result. The processor 1280 may change a capturing direction of the first camera 1240-1 based on a location (or movement) of the recognized user. For example, the processor 1280 may control the drive module 1260-1 to change the capturing direction of the first camera 1240-1.

The processor 1280 may receive a request for permission to control at least one is camera from the external electronic device through the communication module 1210. For example, the processor 1280 may receive a request for permission to control the second camera 1240-2.

FIGS. 13A to 13D illustrate an approval process by an electronic device of a request for remote control of an external electronic device, according to an embodiment of the present disclosure.

Referring to FIGS. 13A to 13D, an electronic device 1200 and a user terminal device 1300 are shown. The processor 1280 of the electronic device 1200 may receive a user input from a user for approving or rejecting a request, received from an external electronic device, for permission to control at least one camera of the electronic device 1200.

Figure 13A:
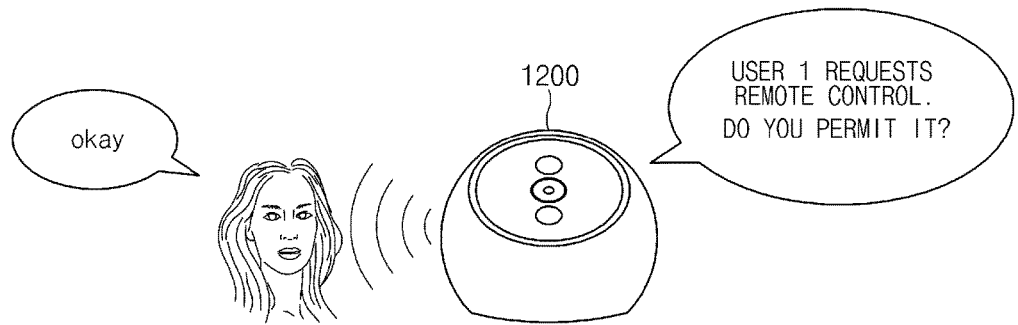
FIGS. 13A to 13D illustrate an approval process of a request by an electronic device for remote control of an external electronic device, according to an embodiment of the present disclosure.

For example, as shown in FIG. 13A, if the request for permission to control at least one camera of the electronic device 1200 is received from the external electronic device, the processor 1280 may output a voice, through the speaker 1270, for providing a notification that the request for permission to control is received. For example, the electronic device 1200 may output a voice notification, such as, "USER 1 requests remote control. Do you permit it?" In response, the processor 1280 may receive the voice of the user, through the voice recognition sensor of the input module 1230, for approving or rejecting the permission to control from the user.

Figure 13B:
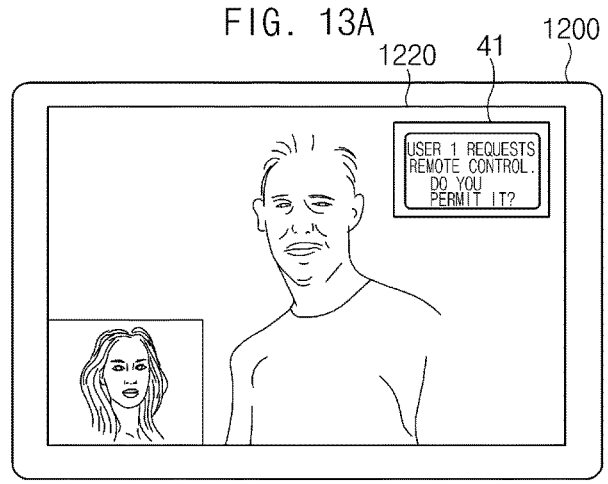

Alternatively, as shown in FIG. 13B, if the request for permission to control at least one camera of the electronic device 1200 is received from the external electronic device, the processor 1280 may display a text object 41, in the display 1220, for providing a notification that the request for permission to control is received. For example, the processor 1280 may display the text object 41, such as, "USER 1 requests remote control. Do you permit it?" In response, the processor 1280 may receive a user input, through the touch panel of the input module 1230, for approving or rejecting the permission to control.

Figure 13C:
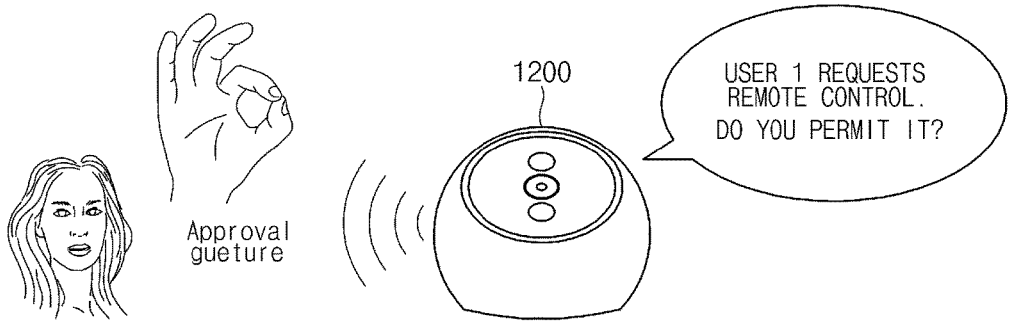

Alternatively, as shown in FIG. 13C, if the request for permission to control at least one camera of the electronic device 1200 is received from the external electronic device, the processor 1280 may output a voice, through the speaker 1270, for providing a notification that the request for the permission to control is received. For example, the electronic device 1200 may output a voice notification, such as, "USER 1 requests remote control. Do you permit it?" In response, the processor 1280 may receive a gesture from the user, through the motion recognition sensor of the input module 1230, for approving or rejecting the permission to control.

Figure 13D:
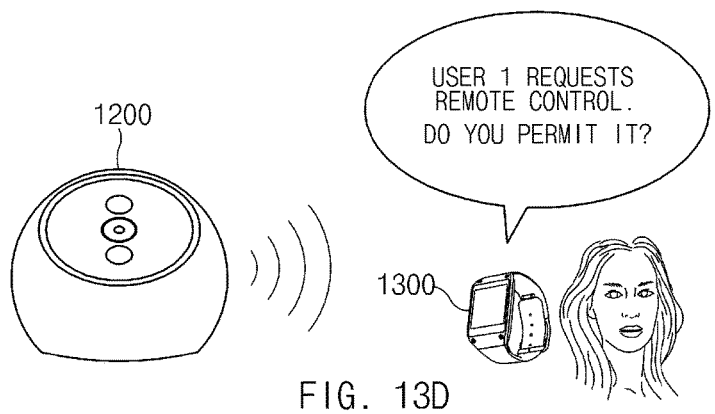

If the request for the permission to control at least one camera of the electronic device 1200 is received from the external electronic device, the processor 1280 may send a message to the user terminal device 1300, as shown in FIG. 13D. If the message is received, the user terminal device 1300 may output a voice for providing a notification that the request for permission to control is received. For example, the user terminal device 1300 may output a voice notification, such as, "USER 1 requests remote control. Do you permit it?" In response, the user terminal device 1300 may receive a voice or a touch input of a user for approving or rejecting the permission to control. The user terminal device 1300 may send a response message to the electronic device 1200 notifying of the approval or rejection for the permission to control, based on the received user input.

Figure 14:
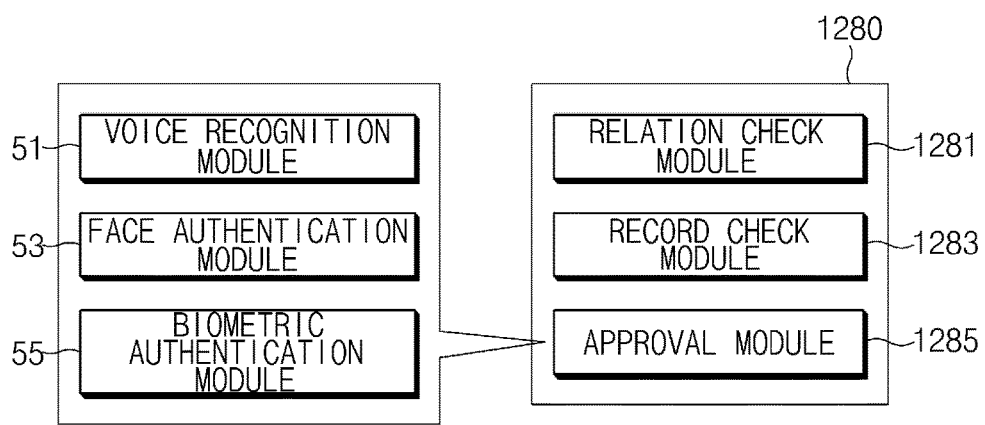
FIG. 14 is a block diagram of a program module of a processor of an electronic device, according to an embodiment of the present disclosure.

FIG. 14 is a block diagram of a program module of a processor of an electronic device, according to an embodiment of the present disclosure.

Referring to FIG. 14, the processor 1280 of the electronic device 1200 is provided. The processor 1280 includes a relation check module 1281, a record check module 1283, and an approval module 1285. The processor 1280 may approve permission to control at least one camera of the electronic device 1200 or may perform user authentication, by is using at least one module of the relation check module 1281, the record check module 1283, and the approval module 1285.

The relation check module 1281 may verify a relation with a first user of an external electronic device that requests permission to control at least one camera of the electronic device 1200. For example, the relation check module 1281 may identify a face of the first user by using the image received from the external electronic device. Alternatively, the relation check module 1281 may identify the first user by using a voice of the first user received from the external electronic device. Alternatively, the relation check module 1281 may identify the first user by using identification information (e.g., mobile station international integrated services digital network (ISDN) number (MSISDN), international mobile equipment identity (IMEI), or the like) of the external electronic device. The relation check module 1281 may determine a relationship between the second user of the electronic device 1200 and the first user of the external electronic device based on the identification information.

The record check module 1283 may verify a record of a video call with the first user of the external electronic device. For example, the record check module 1283 may verify the number of occurrences of video calls, the total talk time, conversation contents during video calls, and the like with the first user.

The approval module 1285 may approve a request for permission to control at least one camera of the electronic device 1200. For example, the approval module 1285 may approve the request for permission to control based on friendliness with the first user of the external electronic device. For example, if the degree of friendliness of the first user is greater than or equal to a specified value, the approval module 1285 may automatically approve the request for permission to control. The friendliness may be determined on the basis of, the number of occurrences of video calls, the total talk time, conversation contents during video calls, a relationship, and the like with the second user is of the electronic device 1200.

The approval module 1285 may approve or reject the request for permission to control at least one camera of the electronic device 1200 based on a user input of the second user of the electronic device 1200. The approval module 1285 includes a voice recognition module 51, a face authentication module 53, and a biometric authentication module 55. If a user input for approving control of at least one camera of the electronic device 1200 is received, the approval module 1285 may perform user authentication to determine whether the user input is a user input received from a legitimate user (or a user that is registered in advance) of the electronic device 1200, by using at least one of the voice recognition module 51, the face authentication module 53, and the biometric authentication module 55. For example, the approval module 1285 may authenticate the second user of the electronic device 1200 by using a face, an iris, a fingerprint, a voice, or the like of the second user.

When the user authentication is completed, the processor 1280 may send approval information about the request for permission to control at least one camera of the electronic device 1200 to the external electronic device, through the communication module 1210.

If the request for the permission to control at least one camera of the electronic device 1200 is approved, the processor 1280 may capture an image by using the approved camera, such as, the second camera 1240-2. If the request for permission to control a camera of the electronic device 1200 is approved for the second camera 1240-2, which does not capture an image for the video call, the processor 1280 may capture an image by using the second camera 1240-2 after changing a capturing direction of the second camera 1240-2 into a capturing direction of the first camera 1240-1, which photographs an image.

If an image captured by the first camera 1240-1 is changed into an image captured by the second camera 1240-2, the first user of the external electronic device fails to know which direction the second camera 1240-2 currently faces. Accordingly, if the request for the permission to control a camera of the electronic device 1200 is approved, the processor 1280 may allow the first user of the electronic device to recognize the capturing direction by matching capturing directions of the first camera 1240-1 and the second camera 1240-2 with each other.

If the second camera 1240-2 starts to photograph, the processor 1280 may stop the capturing of the first camera 1240-1. Alternatively, the processor 1280 may capture an image by using both the first camera 1240-1 and the second camera 1240-2, without stopping the capturing of the first camera 1240-1. That is, the capturing direction of the first camera 1240-1 may be changed according to a location of the second user of the electronic device 1200, and the capturing direction of the second camera 1240-2 may be changed according to control of the first user of the external electronic device.

If the first user of the external electronic device has permission to control the second camera 1240-2, the processor 1280 may send the image that is captured by the second camera 1240-2, to the external electronic device. For example, the processor 1280 may send only the image that is captured by the second camera 1240-2, to the external electronic device. As another example, the processor 1280 may send both the image captured by the first camera 1240-1 and the image captured by the second camera 1240-2.

The processor 1280 may receive a control signal for controlling the first camera 1240-1 or the second camera 1240-2 of the electronic device 1200 from the external electronic device through the communication module 1210. The processor 1280 may receive the control signal generated to correspond to a touch input of the first user of the external electronic device. The processor 1280 may receive the control signal generated to correspond to a voice of the first user. The processor 1280 may receive the control signal generated to correspond to motion (i.e., a gesture) of the first user. The processor 1280 may receive the control signal generated to correspond to motion of the external electronic device. The processor 1280 may receive the control signal generated to correspond to change in a capturing direction of a camera included in the external electronic device. The processor 1280 may receive the control signal generated to correspond to motion of the user terminal device 200 connected with the external electronic device. Various methods of generating the control signal that the electronic device 1200 receives from the external electronic device are described, and thus the detailed description thereof is not repeated here.

The processor 1280 may control at least one camera (e.g., the second camera 1240-2) based on the control signal received from the external electronic device. For example, the processor 1280 may control at least one of the first drive module 1260-1 and the second drive module 1260-2 to change a capturing direction of the second camera 1240-2.

Figure 15:
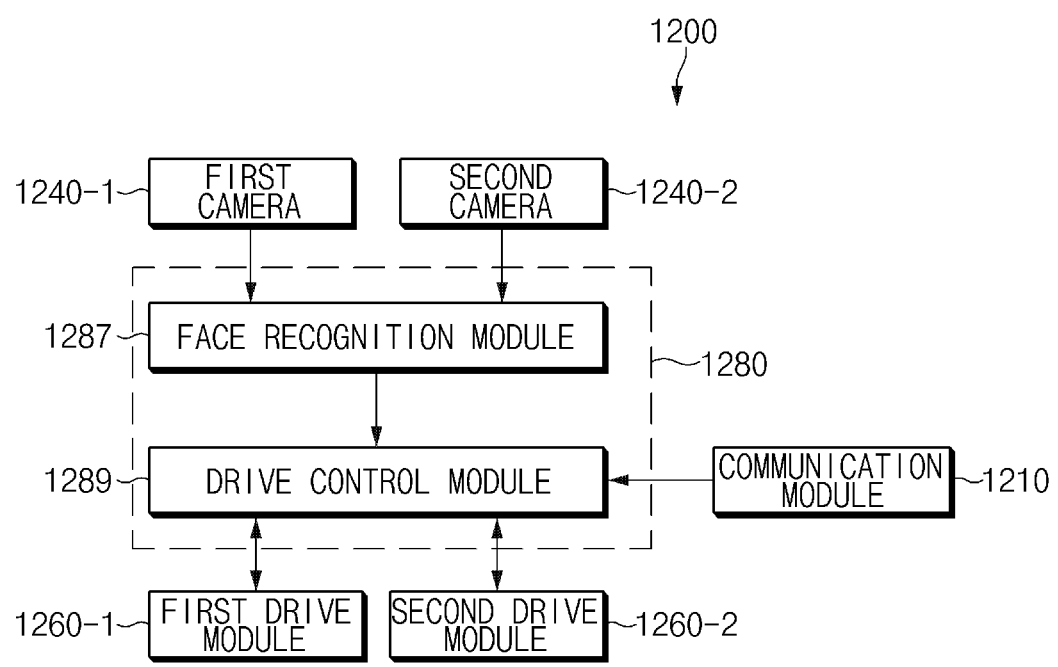
FIG. 15 illustrates a control process of a drive control module of an electronic device, according to an embodiment of the present disclosure.

FIG. 15 illustrates a control process of a drive control module of an electronic device, according to an embodiment of the present disclosure.

Referring to FIG. 15, an electronic device 1200 is provided. The processor 1280 of the electronic device 1200 includes a face recognition module 1287 and a drive control module 1289. If a video call with an external electronic device starts, the face recognition module 1287 may recognize a face of the second user of the electronic device 1200 by using an image input from at least one of a plurality of cameras 1240-1 and 1240-2. The face recognition module 1287 may send the face recognition result (e.g., a location of the face, a movement direction of the face, or the like) to the drive control module 1289. The drive control module 1289 may generate a first drive control signal that makes it possible to track the second user based on the face recognition result and may control the first drive module 1260-1 and the second drive module 1260-2 based on the first drive control is signal.

If the external electronic device has permission to control at least one of the plurality of cameras 1240-1 and 1240-2 of the electronic device 1200, the drive control module 1289 may receive a second drive control signal for controlling at least one of the plurality of cameras 1240-1 and 1240-2 through the communication module 1210. The drive control module 1289 may control the first drive module 1260-1 and the second drive module 1260-2 based on the second drive control signal received from the external electronic device.

In the case where the tracking of the user and the control by the external electronic device are performed at the same time (e.g., in the case where the face of the second user is tracked by using the first camera 1240-1 and the external electronic device controls the second camera 1240-2), the drive control module 1289 may generate a third drive control signal based on the first drive control signal, which is generated on the basis of the face recognition result, and the second drive control signal received from the external electronic device. The drive control module 1289 may control the first drive module 1260-1 and the second drive module 1260-2 based on the third drive control signal.

Figure 16:
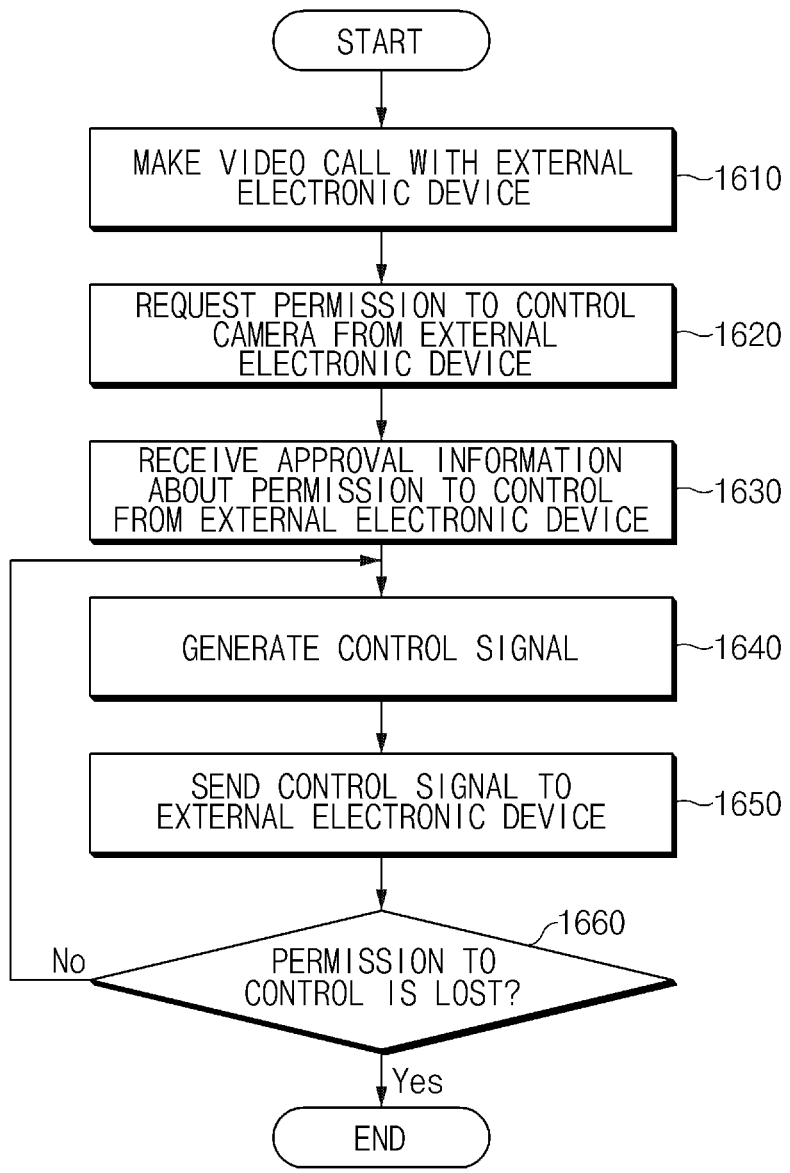
FIG. 16 is a flowchart of a video call method of a first electronic device, according to an embodiment of the present disclosure.

FIG. 16 is a flowchart of a video call method of a first electronic device, according to an embodiment of the present disclosure.

Referring to FIG. 16, a method of performing a video call in the electronic device 600 is described.

At step 1610, the electronic device 600 makes a video call with an external electronic device. For example, the electronic device 600 may request the video call from the external electronic device based on a first user input. If the video call is accepted by the external electronic device, the electronic device 600 may start the video call with the external electronic device. For example, the electronic device 600 may send an image captured by a camera 640 to the external electronic device and may display an image received from the external electronic device in a display 620. If the video call starts, the electronic device 600 may generate a video call session for sending or receiving data (e.g., image data or audio data), which is necessary for the video call, to or from the external electronic device.

At step 1620, the electronic device 600 may request permission from the external electronic device to control at least one camera included in the external electronic device, through a communication module. For example, if a user input for requesting permission to control the at least one camera included in the external electronic device is received through an input module 630, the electronic device 600 may request the permission to control the at least one camera from the external electronic device.

At step 1630, the electronic device 600 may receive approval information from the external electronic device about the request for permission to control the at least one camera included in the external electronic device. If the approval information about the request for the permission to control is received from the external electronic device, the electronic device 600 may generate a control session for sending a control signal to the external electronic device.

At step 1640, the electronic device 600 may generate the control signal for controlling a capturing direction of the at least one camera included in the external electronic device. For example, the electronic device 600 may recognize a voice of the first user of the electronic device 600 and may generate the control signal corresponding to the voice of the first user. The electronic device 600 may recognize motion (i.e., a gesture) of the first user and may generate the control signal corresponding to the motion of the first user. The electronic device 600 may track the first user by using an image captured by the camera 640 and may generate the control signal corresponding to a change of the capturing direction of the camera 640 based on the tracking of the first user. The electronic device 600 may detect motion of the electronic device 600 and may is generate the control signal corresponding to the motion of the electronic device 600. If motion information of the user terminal device 200 is received from the user terminal device 200, the electronic device 600 may generate the control signal corresponding to motion of the user terminal device 200.

At step 1650, the electronic device 600 may send the control signal to the external electronic device. The electronic device 600 may send the control signal to the external electronic device through a video call session. The electronic device 600 may send the control signal through the control session.

At step 1660, the electronic device 600 may determine whether permission to control at least one camera included in the external electronic device is lost. For example, if the video call with the external electronic device is ended, if a user input for giving up permission to control is received, or if a message for canceling permission to control is received from the external electronic device, the electronic device 600 may lose permission to control that the electronic device 600 has. If the electronic device 600 has not lost the permission to control, the electronic device 600 may perform operation 1640 and operation 1650 again.

Figure 17:
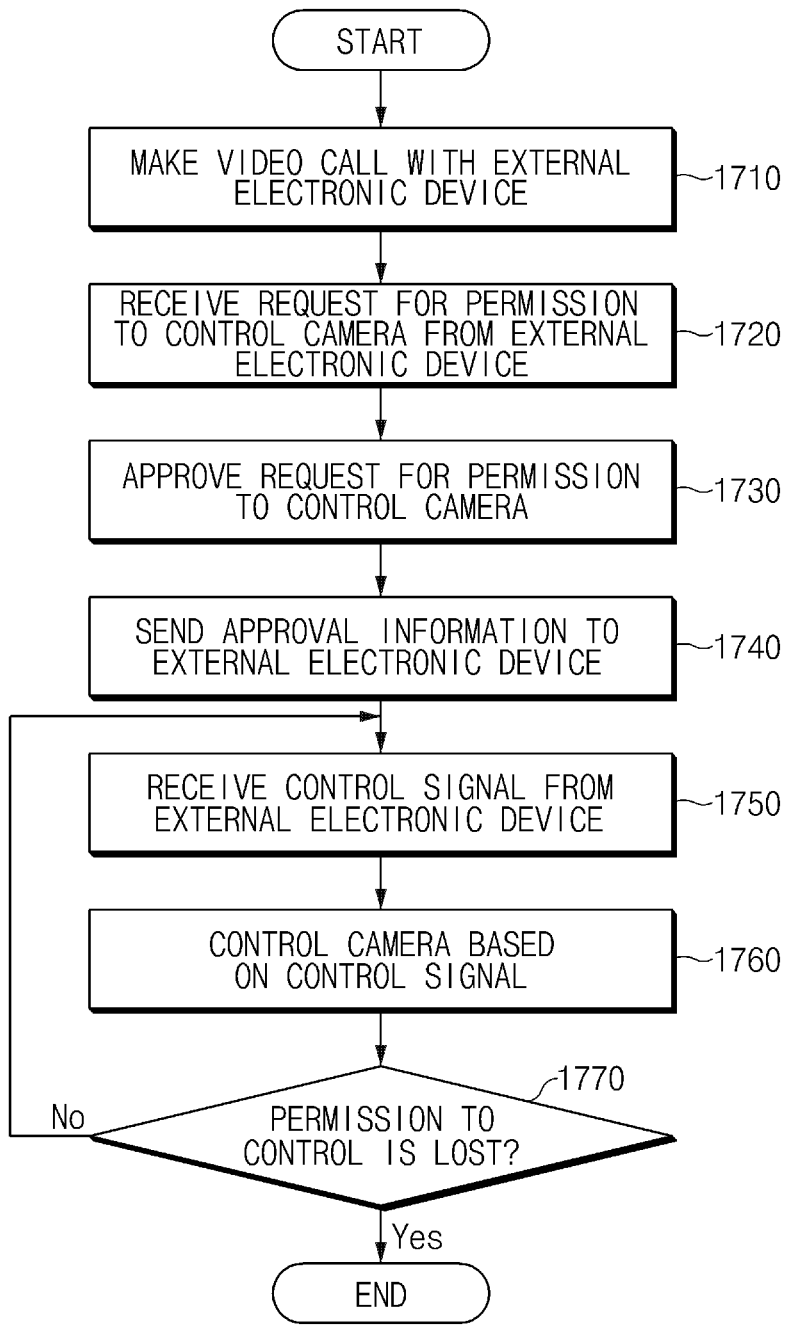
FIG. 17 is a flowchart of a video call method of a first electronic device, according to an embodiment of the present disclosure.

FIG. 17 is a flowchart of a video call method of a first electronic device, according to an embodiment of the present disclosure.

Referring to FIG. 17, a method of performing a video call in the electronic device 1200 is described. At step 1710, the electronic device 1200 may make a video call with an external electronic device. The electronic device 1200 may receive a request for the video call from the external electronic device. The electronic device 1200 may receive a user input for accepting the request for the video call through an input module 1230. If the user input is received, the electronic device 1200 may send the information about acceptance of the video call to the external electronic device and may start the video call with the external electronic device. For example, the electronic device 1200 may send an image captured by a first camera 1240-1 to the external electronic device and may display the image, which is received from the external electronic device, in the display 1220. When the electronic device 1200 makes the video call, the electronic device 1200 may track a second user of the electronic device 1200 based on the image captured by the first camera 1240-1.

At step 1720, the electronic device 1200 may receive a request, from the external electronic device, through a communication module 1210, for permission to control at least one camera of the electronic device 1200.

At step 1730, the electronic device 1200 may approve the request for permission to control the at least one camera of the electronic device 1200. The electronic device 1200 may receive a user input for approving the request for the permission to control from the second user. If the user input for approving control of the at least one camera is received, the electronic device 1200 may perform user authentication to determine whether the user input is a user input received from a legitimate user. If a request for permission to control at least one camera is received from the external electronic device, the electronic device 1200 may approve the request for the permission to control based on friendliness with the first user of the external electronic device that currently makes the video call.

At step 1740, the electronic device 1200 may send approval information about the request for permission to control the at least one camera of the electronic device 1200 to the external electronic device through the communication module 1210.

If the request for permission to control the at least one camera of the electronic device 1200 is approved, the electronic device 1200 may capture an image by using the approved camera, such as the second camera 1240-2. In the case where the electronic device 1200 includes a plurality of cameras, if the request is approved for permission to control the second camera 1240-2, which does not capture an image for the video call, the electronic device 1200 may capture an image by using the second camera 1240-2 after changing a capturing direction of the second camera 1240-2 into a capturing direction of the first camera 1240-1 that photographs an image. If the second camera 1240-2 starts to photograph, the electronic device 1200 may stop the capturing of the first camera 1240-1. Alternatively, the electronic device 1200 may capture an image by using both the first camera 140-1 and the second camera 1240-2, without stopping the capturing of the first camera 1240-1. The electronic device 1200 may send the image that is captured by the second camera 1240-2, to the external electronic device. For example, the electronic device 1200 may send only the image that is captured by the electronic device 1200, to the external electronic device. As another example, the electronic device 1200 may send both the image captured by the first camera 1240-1 together with the image captured by the second camera 1240-2.

At step 1750, the electronic device 1200 may receive a control signal for controlling at least one camera of the electronic device 1200, from the external electronic device through the communication module 1210. The electronic device 1200 may receive the control signal generated to correspond to a voice of the first user. The electronic device 1200 may receive the control signal generated to correspond to motion (i.e., a gesture) of the first user. The electronic device 1200 may receive the control signal generated to correspond to motion of the external electronic device. The electronic device 1200 may receive the control signal generated to correspond to change in a capturing direction of a camera included in the external electronic device. The electronic device 1200 may receive the control signal generated to correspond to motion of the user terminal device 200 connected with the external electronic device.

At step 1760, the electronic device 1200 may control the at least one camera of the electronic device 1200 based on the control signal received from the external electronic device. For example, the electronic device 1200 may control at least one of a first drive is module 1260-1 and a second drive module 1260-2 to change a capturing direction of at least one camera of the electronic device 1200.

At step 1770, the electronic device 1200 may determine whether the permission to control the at least one camera of the electronic device 1200 by the external electronic device is lost. For example, if the video call with the external electronic device is ended, if a user input for canceling the permission to control is received, or if a message for canceling the permission to control is received from the external electronic device, the permission to control the at least one camera of the electronic device 1200 by the external electronic device may be lost. If the external electronic device has not lost the permission to control, the electronic device 1200 may perform operation 1750 and operation 1760 again.

Figure 18:
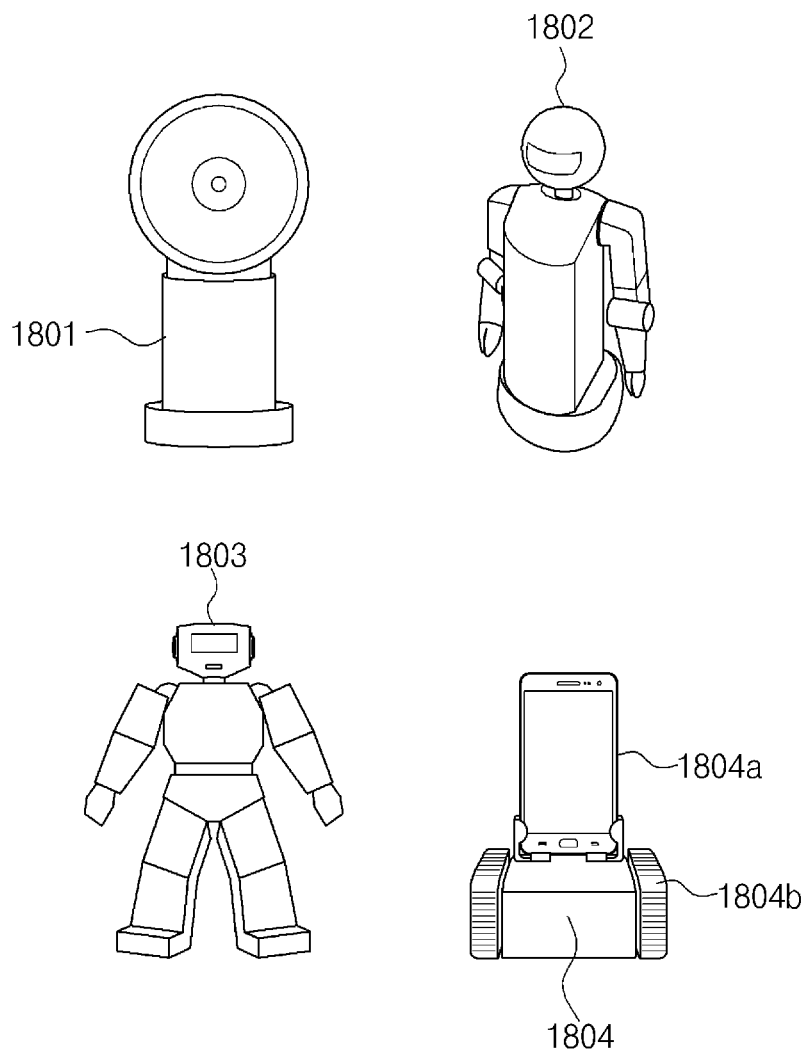
FIG. 18 illustrates various electronic devices, according to an embodiment of the present disclosure.

FIG. 18 illustrates various electronic devices, according to an embodiment of the present disclosure.

Referring to FIG. 18, electronic devices of various types are shown. For example, the election devices may be classified into standalone-type electronic devices 1801, 1802, and 1803 and a docking-station-type electronic device 1804 are shown. Each of the standalone-type electronic devices 1801, 1802, and 1803 may independently perform all functions of an electronic device. In the docking-station-type electronic device 1804, two or more electronic devices operatively separated may be combined into one electronic device. The docking-station-type electronic device 1804 may perform all functions of the electronic device. For example, the docking-station-type electronic device 1804 may include a body 1804a (e.g., a HMD device) and a drive unit 1804b, and the body 1804a mounted in a docking station (the drive unit 1804b) may move to a desired location.

The electronic devices may further be classified into a fixed-type electronic device 1801 and movement-type electronic devices 1802, 1803, and 1804 based on movement of the electronic device. The fixed-type electronic device 1801 does not autonomously move is because the fixed-type electronic device 1801 does not have the drive unit. Each of the movement-type electronic devices 1802, 1803, and 1804 may include the drive unit and may move to a desired location. Each of the movement-type electronic devices 1802, 1803, and 1804 may include a wheel, a caterpillar, or a leg as the drive unit. Furthermore, each of the movement-type electronic devices 1802, 1803, and 1804 may include a drone.

Figure 19:
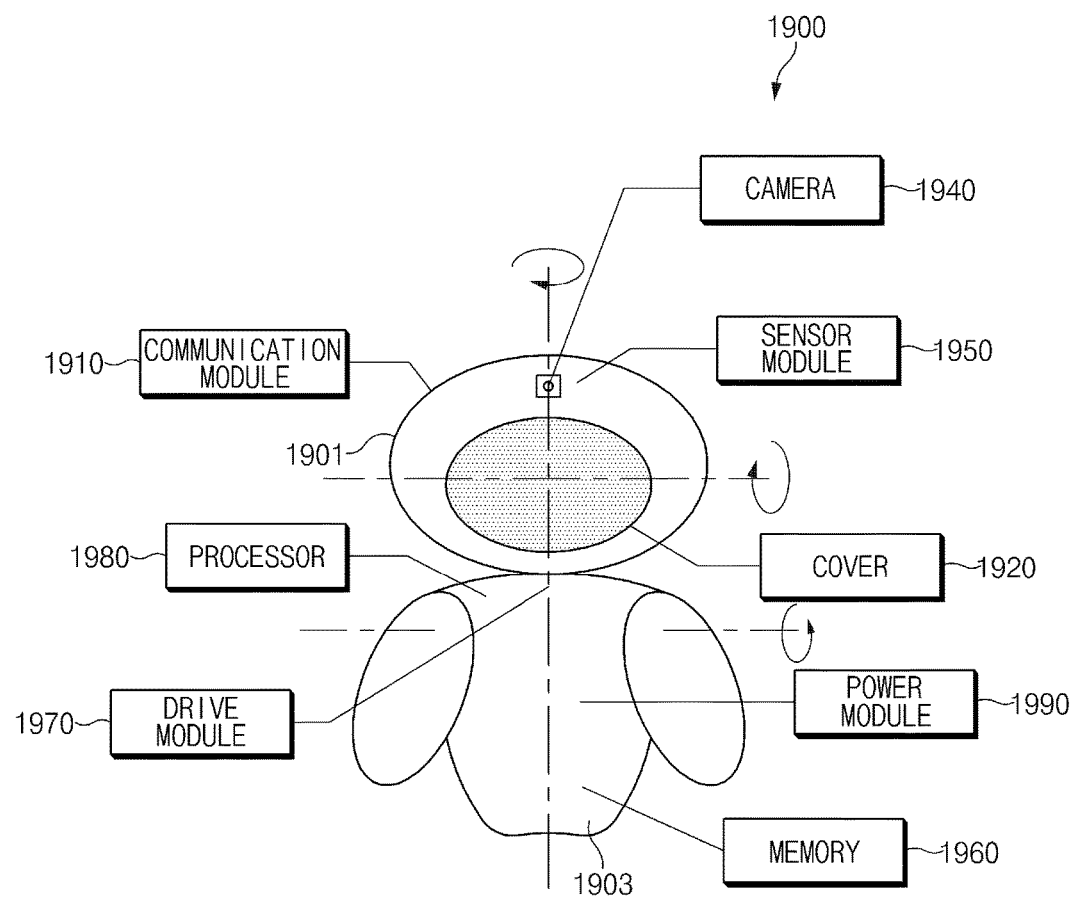
FIG. 19 illustrates an electronic device, according to an embodiment of the present disclosure.

FIG. 19 illustrates an electronic device, according to an embodiment of the present disclosure.

Referring to FIG. 19, an electronic device 1900 implemented in the form of a robot is shown. The electronic device 1900 includes a first body 1901 and a second body 1903. The first body 1901 may be arranged on the second body 1903. The first body 1901 and the second body 1903 may be implemented with shapes corresponding to a head and a body of a person, respectively. The electronic device 1900 may include a cover 1920 that is arranged on a front side of the first body 1901. The cover 1920 may be formed of transparent material or translucent material. The cover 1920 may indicate a direction for interacting with a user. The cover 1920 may include at least one sensor that senses an image, at least one microphone that obtains audio, at least one speaker that outputs the audio, a display, a mechanical eye structure, and the like. The cover 1920 may display a direction through light or a temporary device change. When the electronic device 1900 interacts with a user, the cover 1920 may include at least one or more hardware or mechanic structures that face a direction of the user.

The first body 1901 includes a communication module 1910, a camera 1940, and a sensor module 1950.

The communication module 1910 may receive a message from an external electronic device and may send a message to the external electronic device.

The camera 1940 may capture an external environment of the electronic device 1900. For example, the camera 1940 may generate an image by capturing the user.

The sensor module 1950 may obtain information about the external environment. For example, the sensor module 1950 may sense the user that approaches the electronic device 1900. The sensor module 1950 may sense a proximity of the user based on proximity information or may sense the proximity of the user based on a signal from another electronic device (e.g., a wearable device) that the user employs. In addition, the sensor module 1950 may sense an action and a location of the user.

The second body 1903 includes a memory 1960, a drive module 1970, a processor 1970, and a power module 1990.

The drive module 1970 may include at least one motor that is capable of moving the first body 1901. The drive module 1970 may change a direction of the first body 1901. As the direction of the first body 1901 is changed a capturing direction of the camera 1940 may be changed. The form of the drive module 1970 may be a form that is capable of moving vertically or horizontally about at least one or more axes, and the form may be implemented in various manners.

The power module 1990 may supply power that the electronic device 1900 uses.

The processor 1980 may obtain a message, which is wirelessly received from another electronic device, through the communication module 1910 and may obtain a voice message through the sensor module 1950. The processor 1980 may include at least one message analysis module. The at least one message analysis module may extract main content, which a sender wants to send to a receiver, from a message that the sender generates or may classify the content. The processor 1980 may control the electronic device 1900. The processor 1980 may operatively control the communication module 1910, the display, the microphone, the speaker, the camera 1940, the sensor module 1950, the memory 1960, the drive module 1970, and the power module 1990 to provide the user with a service. An information determination unit that determines information, which the electronic device 1900 is capable of obtaining, may be included in at least a part of the processor 1980 or the memory 1960. In this case, the information determination unit may extract at least one or more pieces of data for a service from information obtained through the sensor module 1950 or the communication module 1910.

The memory 1960 may be a storage unit, which is capable of permanently or temporarily storing information associated with providing the user with a service, and may be in the electronic device 1900. The information in the memory 1960 may be in a cloud or another server accessed through a network. The memory 1960 may store spatial information, which is generated by the electronic device 1900 or which is received from the outside. In the memory 1960, personal information for user authentication, information about attributes associated with a method for providing the user with a service, and information for recognizing a relation between various means for interacting with the electronic device 1900 may be stored. In this case, the information about the relation may be changed because the information is updated or learned according to usage of the electronic device 1900.

Figure 20:
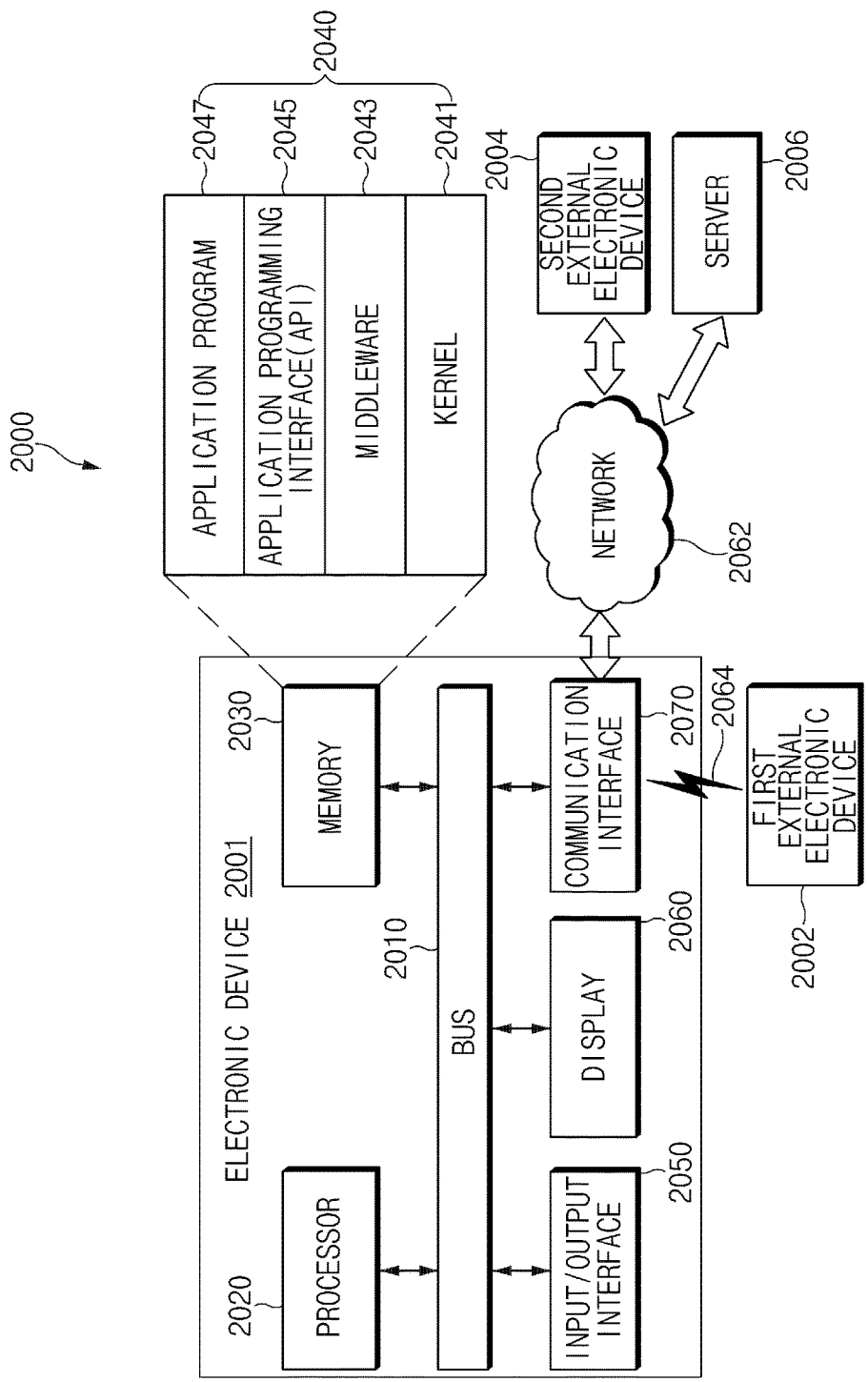
FIG. 20 is a block diagram of a configuration of an electronic device in a network environment, according to an embodiment of the present disclosure.

FIG. 20 is a block diagram of a configuration of an electronic device in a network environment, according to an embodiment of the present disclosure.

Referring to FIG. 20, an electronic device 2001 in a network environment 2000 is provided. The electronic device 2001 includes a bus 2010, a processor 2020, a memory 2030, an input/output interface 2050, a display 2060, and a communication interface 2070. At least one of the foregoing elements may be omitted or another element may be added to the electronic device 2001.

The bus 2010 may include a circuit for connecting the above-mentioned elements 2010 to 2070 to each other and transferring communications (e.g., control messages and/or data) among the above-mentioned elements.

The processor 2020 may include at least one of a CPU, an application processor (AP), or a communication processor (CP). The processor 2020 may perform data is processing or an operation related to communication and/or control of at least one of the other elements of the electronic device 2001.

The memory 2030 may include a volatile memory and/or a nonvolatile memory. The memory 2030 may store instructions or data related to at least one of the other elements of the electronic device 2001. The memory 2030 may store software and/or a program 2040. The program 2040 includes a kernel 2041, a middleware 2043, an application programming interface (API) 2045, and/or an application program 2047. At least a portion of the kernel 2041, the middleware 2043, or the API 2045 may be referred to as an operating system (OS).

The kernel 2041 may control or manage system resources (e.g., the bus 2010, the processor 2020, the memory 2030, or the like) used to perform operations or functions of other programs (e.g., the middleware 2043, the API 2045, or the application program 2047). Furthermore, the kernel 2041 may provide an interface for allowing the middleware 2043, the API 2045, or the application program 2047 to access individual elements of the electronic device 2001 in order to control or manage the system resources.

The middleware 2043 may serve as an intermediary so that the API 2045 or the application program 2047 communicates and exchanges data with the kernel 2041.

Furthermore, the middleware 2043 may handle one or more task requests received from the application program 2047 according to a priority order. For example, the middleware 2043 may assign at least one application program 2047 a priority for using the system resources (e.g., the bus 2010, the processor 2020, the memory 2030, or the like) of the electronic device 2001. The middleware 2043 may handle the one or more task requests according to the priority assigned to the at least one application program 2047, thereby performing scheduling or load balancing with respect to the one or more task requests.

The API 2045, which is an interface for allowing the application program 2047 to is control a function provided by the kernel 2041 or the middleware 2043, may include, for example, at least one interface or function (e.g., instructions) for file control, window control, image processing, character control, or the like.

The input/output interface 2050 may serve to transfer an instruction or data input from a user or another external device to another element of the electronic device 2001. Furthermore, the input/output interface 2050 may output instructions or data received from another element of the electronic device 2001 to the user or another external device.

The display 2060 may include, for example, a liquid crystal display (LCD), a light-emitting diode (LED) display, an organic light-emitting diode (OLED) display, a microelectromechanical systems (MEMS) display, or an electronic paper display. The display 2060 may present various content (e.g., a text, an image, a video, an icon, a symbol, or the like) to the user. The display 2060 may include a touch screen, and may receive a touch, gesture, proximity or hovering input from an electronic pen or a part of a body of the user.

The communication interface 2070 may set communications between the electronic device 2001 and a first external electronic device 2002, a second external electronic device 2004, or a server 2006. For example, the communication interface 2070 may be connected to the first external electronic device 2002 through short range communication 2064 and may be connected to the second external electronic device 2004 and the server 2006 through a network 2062 via wireless communications or wired communications so as to communicate with the external device.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include the short-range communications 2064. The short-range communications 2064 may include at least one of Wi-Fi, Bluetooth, Bluetooth low energy (BLE), Zigbee, near field communication (NFC), magnetic secure transmission (MST), or GNSS. The GNSS may include at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like.

The network 2062 may include at least one of telecommunications networks, for example, a computer network (e.g., local area network (LAN) or wide area network (WAN)), the Internet, or a telephone network.

The types of the first external electronic device 2002 and the second external electronic device 2004 may be the same as or different from the type of the electronic device 2001. The server 2006 may include a group of one or more servers. A portion or all of operations performed in the electronic device 2001 may be performed in one or more other electronic devices (e.g., the first electronic device 2002, the second external electronic device 2004, or the server 2006). When the electronic device 2001 should perform a certain function or service automatically or in response to a request, the electronic device 2001 may request at least a portion of functions related to the function or service from another device (e.g., the first electronic device 2002, the second external electronic device 2004, or the server 2006) instead of or in addition to performing the function or service for itself. The other electronic device (e.g., the first electronic device 2002, the second external electronic device 2004, or the server 2006) may perform the requested function or additional function, and may transfer a result of the performance to the electronic device 2001. The electronic device 2001 may use a received result itself or additionally process the received result to provide the requested function or service. To this end cloud computing technology, distributed computing technology, or client-server computing technology may be used.

Figure 21:
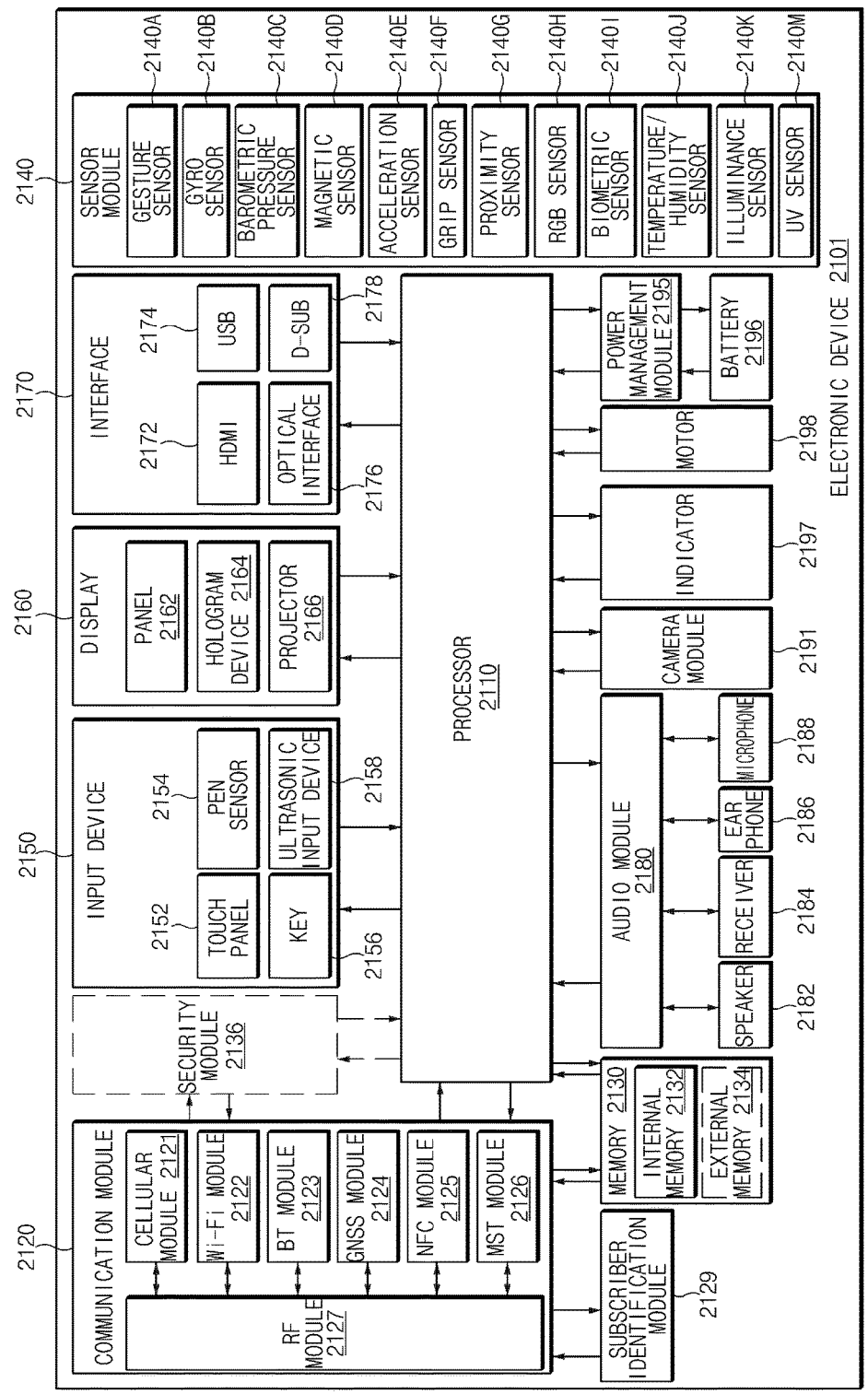
FIG. 21 is a block diagram of a configuration of an electronic device, according to an embodiment of the present disclosure.

FIG. 21 is a block diagram of a configuration of an electronic device, according to an embodiment of the present disclosure.

Referring to FIG. 21, an electronic device 2101 is provided. The electronic device 2101 includes a processor 2110, a communication module 2120, a subscriber identification module (SIM) 2129, a memory 2130, a security module 2136, a sensor module 2140, an input device 2150, a display 2160, an interface 2170, an audio module 2180, a camera module 2191, a power management module 2195, a battery 2196, an indicator 2197, and a motor 2198.

The processor 2110 may run an operating system or an application program so as to control a plurality of hardware or software elements connected to the processor 2110, and may process various data and perform operations. The processor 2110 may be implemented with a SoC. The processor 2110 may further include a graphic processing unit (GPU) and/or an image signal processor. The processor 2110 may include at least a portion (e.g., a cellular module 2121) of the other elements of the electronic device 2101. The processor 2110 may load, on a volatile memory, an instruction or data received from at least one of other elements (e.g., a nonvolatile memory) to process the instruction or data, and may store various data in a nonvolatile memory.

The communication module 2120 includes a cellular module 2121, a Wi-Fi module 2122, a Bluetooth module 2123, a GNSS module 2124 (e.g., a GPS module, a GLO-NASS module, a BeiDou module, or a Galileo module), an NFC module 2125, a MST module 2126, and a radio frequency (RF) module 2127.

The cellular module 2121 may provide a voice call service, a video call service, a text message service, or an Internet service through a communication network. The cellular module 2121 may identify and authenticate the electronic device 2101 in the communication network using the subscriber identification module 2129. The cellular module 2121 may perform at least a part of functions that may be provided by the processor 2110. The cellular module 2121 may include a CP.

Each of the Wi-Fi module 2122, the Bluetooth module 2123, the GNSS module 2124, the NFC module 2125, and the MST module 2126 may include a processor for processing data transmitted/received through the modules. At least a part of the cellular module 2121, the Wi-Fi module 2122, the Bluetooth module 2123, the GNSS module 2124, the NFC module 2125, and the MST module 2126 may be included in a single integrated chip (IC) or IC package.

The RF module 2127 may transmit/receive communication signals (e.g., RF signals). The RF module 2127 may include a transceiver, a power amp module (PAM), a frequency filter, a low noise amplifier (LNA), an antenna, or the like. At least one of the cellular module 2121, the Wi-Fi module 2122, the Bluetooth module 2123, the GNSS module 2124, the NFC module 2125, and the MST module 2126 may transmit/receive RF signals through a separate RF module.

The SIM 2129 may include an embedded SIM and/or a card containing the subscriber identity module, and may include unique identification information (e.g., an integrated circuit card identifier (ICCID)) or subscriber information (e.g., international mobile subscriber identity (IMSI)).

The memory 2130 may include an internal memory 2132 or an external memory 2134. The internal memory 2132 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 2134 may include a flash drive, such as a compact flash (CF), a secure digital (SD), a Micro-SD, a Mini-SD, an extreme digital (xD), a MultiMediaCard (MMC), a memory stick, or the like. The external memory 2134 may be operatively and/or physically connected to the electronic device 2101 through various interfaces.

A security module 2136, which is a module including a storage space that has a higher security level than the memory 2130, may be a circuit for securing safe data storage and protected execution circumstances. The security module 2136 may be implemented with an additional circuit and may include an additional processor. The security module 2136 may be embodied in an attachable smart chip or SD card, or may include an embedded secure element (eSE), which is installed in a fixed chip. Additionally, the security module 2136 may be driven in another OS which is different from the OS of the electronic device 2101. For example, the security module 2136 may operate based on a java card open platform (JCOP) OS.

The sensor module 2140 may measure a physical quantity or detect an operation state of the electronic device 2101 so as to convert measured or detected information into an electrical signal. The sensor module 2140 may include at least one of a gesture sensor 2140A, a gyro sensor 2140B, a barometric pressure sensor 2140C, a magnetic sensor 2140D, an acceleration sensor 2140E, a grip sensor 2140F, a proximity sensor 2140G, a red/green/blue (RGB sensor 2140H, a biometric sensor 2140I, a temperature/humidity sensor 2140J, an illuminance sensor 2140K, and an ultraviolet (UV) sensor 2140M. Additionally or alternatively, the sensor module 2140 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 2140 may further include a control circuit for controlling at least one sensor included therein. The electronic device 2101 may further include a processor configured to control the sensor module 2140 as a part of the processor 2110 or separately, so that the sensor module 2140 is controlled while the processor 2110 is in a sleep state.

The input device 2150 includes a touch panel 2152, a (digital) pen sensor 2154, a key 2156, and an ultrasonic input device 2158.

The touch panel 2152 may employ at least one of capacitive, resistive, infrared, and ultraviolet sensing methods. The touch panel 2152 may further include a control circuit. The touch panel 2152 may further include a tactile layer so as to provide a haptic feedback to a user.

The (digital) pen sensor 2154 may include a sheet for recognition which is a part of a touch panel or is separate.

The key 2156 may include a physical button, an optical button, and a keypad.

The ultrasonic input device 2158 may sense ultrasonic waves generated by an input tool through a microphone 2188 so as to identify data corresponding to the ultrasonic waves sensed.

The display 2160 includes a panel 2162, a hologram device 2164, and a projector 2166.

The panel 2162 may be flexible, transparent, or wearable. The panel 2162 and the touch panel 2152 may be integrated into a single module.

The hologram device 2164 may display a stereoscopic image in the air using an interference of light.

The projector 2166 may project light onto a screen so as to display an image. The screen may be disposed in the inside or the outside of the electronic device 2101.

The display 2160 may further include a control circuit for controlling the panel 2162, the hologram device 2164, or the projector 2166.

The interface 2170 includes an HDMI 2172, a USB 2174, an optical interface 2176, and a D-subminiature (D-sub) 2178. Additionally or alternatively, the interface 2170 may include a mobile high-definition link (MHL) interface, an SD card/multi-media card (MMC) interface, or an infrared data association (IrDA) interface.

The audio module 2180 may convert a sound into an electrical signal or vice versa. The audio module 2180 may process sound information input or output through a speaker 2182, a receiver 2184, an earphone 2186, or the microphone 2188.

The camera module 2191 is a device for shooting a still image or a video. The camera module 2191 may include at least one image sensor (e.g., a front sensor or a rear sensor), a lens, an image signal processor (ISP), or a flash (e.g., an LED or a xenon lamp).

The power management module 2195 may manage power of the electronic device 2101. The power management module 2195 may include a power management integrated circuit (PMIC), a charger integrated circuit (IC), or a battery gauge. The PMIC may employ a wired and/or wireless charging method. The wireless charging method may include a magnetic resonance method, a magnetic induction method, an electromagnetic method, or the like. An additional circuit for wireless charging, such as a coil loop, a resonant circuit, a rectifier, or the like, may be further included. The battery gauge may measure a remaining capacity, a voltage, current, or temperature of the battery 2196. The battery 2196 may include a rechargeable battery and/or a solar battery.

The indicator 2197 may display a specific state of the electronic device 2101 or a part thereof (e.g., the processor 2110), such as a booting state, a message state, a charging state, or the like.

The motor 2198 may convert an electrical signal into a mechanical vibration, and may generate a vibration or haptic effect.

A processing device (e.g., a GPU) for supporting a mobile TV may be included in the electronic device 2101. The processing device for supporting a mobile TV may process media data according to the standards of digital multimedia broadcasting (DMB), digital video broadcasting (DVB), MediaFLO™, or the like.

Figure 22:
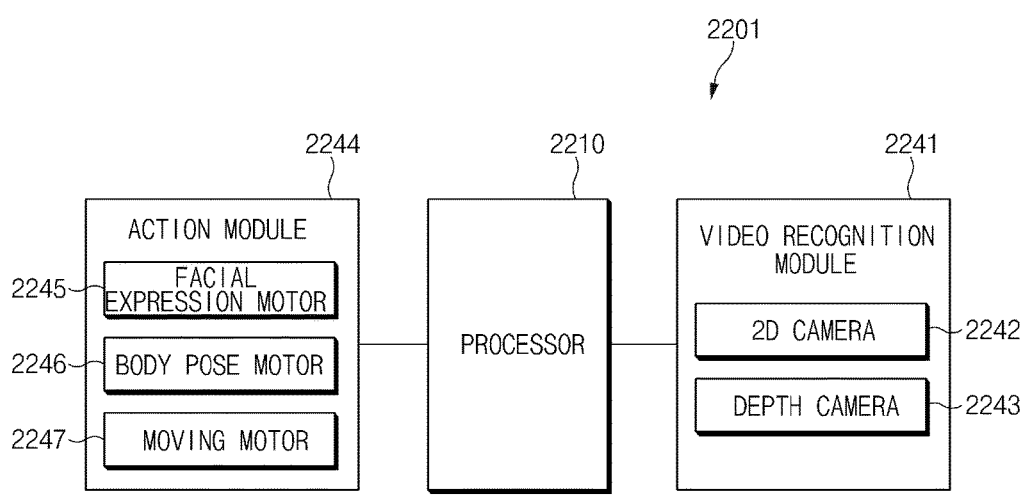
FIG. 22 is a block diagram of components of an electronic device, according to an embodiment of the present disclosure.

FIG. 22 is a block diagram of a components of an electronic device, according to an embodiment of the present disclosure.

Referring to FIG. 22, an electronic device 2201, which is implemented in the form of a robot, is provided. The electronic device 2201 includes a processor 2210, a video recognition module 2241, and an action module 2244. The processor 2210 may be connected with the video recognition module 2241 and the action module 2244.

The video recognition module 2241 includes a 2D camera 2242 and a depth camera 2243. The video recognition module 2241 may perform recognition based on a captured result and may send the recognition result to the processor 2210.

The action module 2244 includes a facial expression motor 2245, a body pose motor 2246, and a moving motor 2247. The facial expression motor 2254 indicates a facial expression in the electronic device 2201 or changes a direction of a face of the electronic device 2201. The body pose motor 2246 changes a pose of a body unit in the electronic device 2201, for example, locations of arms, legs, or fingers. The moving motor 2247 moves the electronic device 2201.

The processor 2210 may control at least one of the facial expression motor 2245, the body pose motor 2246, and the moving motor 2247 to control motion of the electronic device 2201. The processor 2210 may control a facial expression, a head, or a body of the electronic device 2201, based on motion data received from an external electronic device. For example, the electronic device 2201 may receive the motion data from the external electronic device, which is generated based on a facial expression, head motion, or body motion of the user of the external electronic device. The processor 2210 may extract each is of facial expression data, head motion data, or body motion data included in the motion data, and may control the facial expression motor 2245 or the body pose motor 2246 based on the extracted data. The electronic device 2201 may additionally include one or more elements of the electronic device 2101 shown in FIG. 21.

Figure 23:
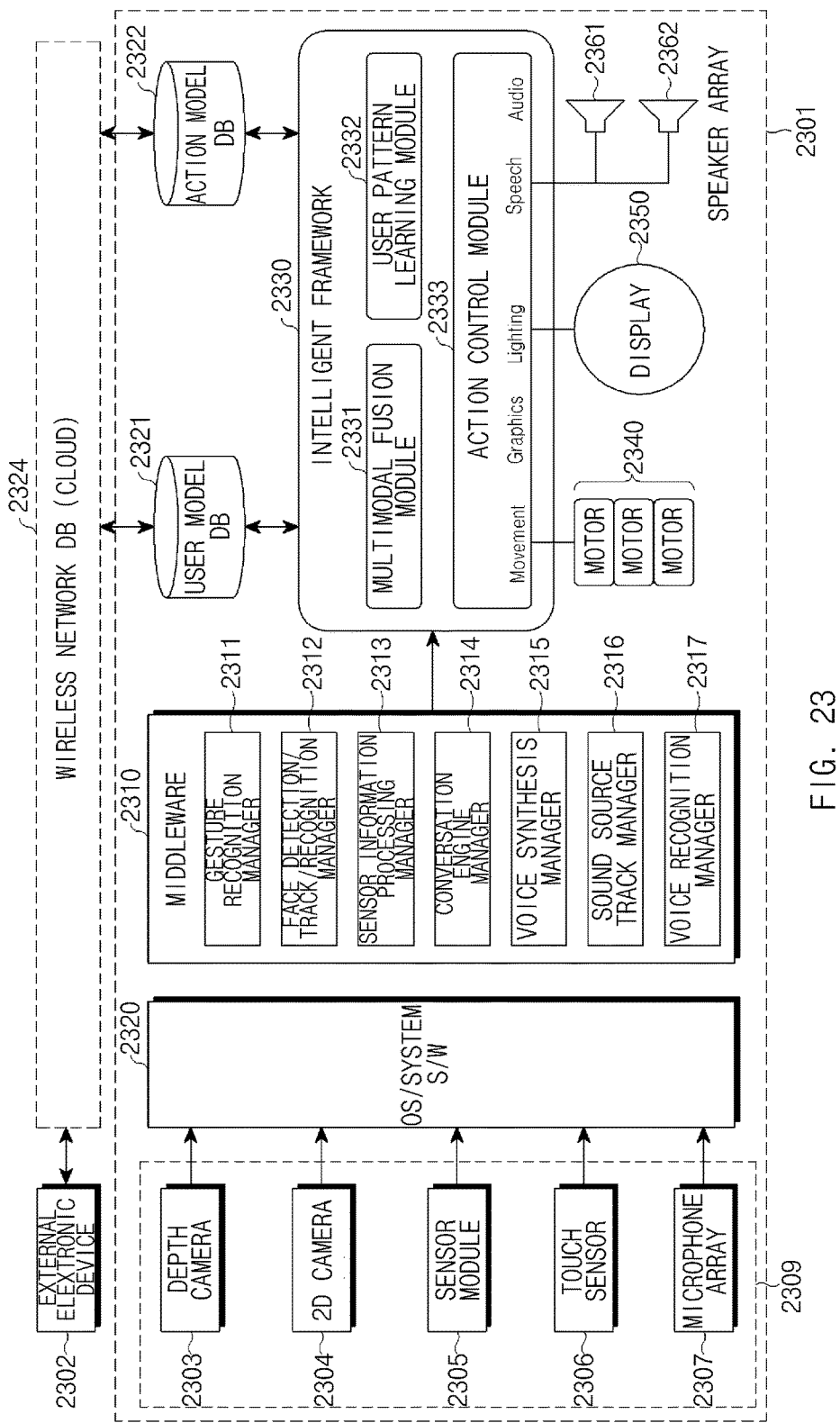
FIG. 23 is a software block diagram of an electronic device, according to an embodiment of the present disclosure.

FIG. 23 is a software block diagram of an electronic device, according to an embodiment of the present disclosure.

Referring to FIG. 23, an electronic device 2301 is provided. The electronic device 2301 includes hardware input units 2309, middleware 2310, an operating system (OS)/system software 2320, a user model database 2321, an action model database 2322, an intelligent framework 2330, one or more motors 2340, a display 2350, and a first and second speaker 2361 and 2362.

The OS/system software 2320 may distribute a resource of the electronic device 2301 and may perform job scheduling and may operate a process. In addition, the OS/system software 2320 may process data received from the various hardware input units 2309.

The hardware input units 2309 include at least one of a depth camera 2303, a 2D camera 2304, a sensor module 2305, a touch sensor 2306, and a microphone array 2307.

The middleware 2310 may perform a function of the electronic device 2301 by using data that the OS/system software 2320 processes. The middleware 2310 includes a gesture recognition manager 2311, a face detection/track/recognition manager 2312, a sensor information processing manager 2313, a conversation engine manager 2314, a voice synthesis manager 2315, a sound source track manager 2316, and a voice recognition manager 2317.

The gesture recognition manager 2311 may recognize a 3D gesture of the user by analyzing an image that is captured by using the 2D camera 2304 and the depth camera 2303. The face detection/track/recognition manager 2312 may detect or track a location of the face of a user by analyzing an image that the 2D camera 2304 photographs and may perform authentication through face recognition. The sound source track manager 2316 may analyze a voice input through the microphone array 2307 and may track an input location associated with a sound source based on the analyzed result. The voice recognition manager 2317 may recognize an input voice by analyzing a voice input through the microphone array 2307.

The intelligent framework 2330 includes a multimodal fusion module 2331, a user pattern learning module 2332, and an action control module 2333. The multimodal fusion module 2331 may collect and manage information that the middleware 2310 processes. The user pattern learning module 2332 may extract and learn meaningful information, such as a life pattern, preference, or the like of the user by using the information of the multimodal fusion module 2331. The action control module 2333 may provide information, which the electronic device 2301 will feed back to the user, such as motion information of the electronic device 2301, visual information, or audio information. That is, the action control module 2333 may control the motors 2340 of a drive unit to move the electronic device 2301, may control the display 2350 such that a graphic object is displayed in the display 2350, and may control the first and second speakers 2361 and 2362 to output audio.

A user model database 2321 may classify data that the electronic device 2301 learns in the intelligent framework 2330 based on a user and may store the classified data.

An action model database 2322 may store data for action control of the electronic device 2301.

The user model database 2321 and the action model database 2322 may be stored in a memory of the electronic device 2301 or may be stored in a cloud server 2324, through a network, and may be shared with an external electronic device 2302.

According to an embodiment of the present disclosure, an electronic device may is include at least one camera, a display, a communication module that communicates with an external electronic device, an input module that receives a user input, and a processor. The processor may be configured to make a video call with the external electronic device by using an image captured by the at least one camera and, if a control signal is received from the external electronic device through the communication module, to change at least one of a capturing direction, a ratio of zoom-in to zoom-out, a resolution, brightness, focus, or white balance of the at least one camera based on the control signal.

The processor may be configured to receive the control signal, which is generated to correspond to motion of the external electronic device, from the external electronic device through the communication module.

The processor may be configured to receive the control signal, which is generated to correspond to motion information of a user terminal device connected with the external electronic device, through the communication module.

The processor may be configured to receive the control signal, which is generated to correspond to motion of a user of the external electronic device, from the external electronic device through the communication module.

The electronic device may further include a drive module that controls motion of the electronic device. The processor may be configured to change at least one of a location of the electronic device and the capturing direction of the at least one camera by controlling the drive module.

The processor may be configured to receive a request for permission to control the at least one camera from the external electronic device through the communication module, and to send approval information about the request for the permission to control if a user input for approving the request for the permission to control is received.

The processor may be configured to perform user authentication if the user input for approving the request for the permission to control is received and to send the is approval information about the request for the permission to control if the user authentication is completed.

The at least one camera may include a first camera and a second camera. The processor may be configured to capture an image by using the first camera if the video call starts, to track a user by using the image captured by the first camera, to change a capturing direction of the first camera based on a location of the user, to capture an image by using the second camera if the user input for approving the request for the permission to control is received and to change a capturing direction of the second camera based on the control signal.

The processor may be configured to capture an image by using the second camera after the capturing direction of the second camera is changed into the capturing direction of the first camera if the user input for approving the request for the permission to control is received.

The processor may be configured to send the image, which is captured by the first camera, to the external electronic device if the video call starts and to send the image, which is captured by the second camera, to the external electronic device if the user input for approving the request for the permission to control is received.

According to an embodiment of the present disclosure, an electronic device may include a display, a communication module that communicates with an external electronic device, an input module receives a user input, and a processor. The processor may be configured to receive image data for making a video call with the external electronic device through the communication module, to display the image data in the display, to request permission to control at least one camera, which is included in the external electronic device, from the external electronic device based on the user input, to receive approval information about the permission to control from the external electronic device, to generate a control signal for controlling at least one of a capturing direction, a ratio of zoom-in to zoom-out, a resolution, brightness, focus, white balance of the at least one camera, and to send the control signal to the external electronic device through the communication module.

The electronic device may further include a sensor module that senses motion of the electronic device. The processor may be configured to generate the control signal corresponding to the motion of the electronic device.

The processor may be configured to receive motion information of a user terminal device from the user terminal device and to generate the control signal corresponding to the motion information.

The electronic device may further include a camera. The processor may be configured to capture an image by using the camera, to track a user by using an image captured by the camera, to change a capturing direction of the camera based on a location of the user, and to generate the control signal corresponding to a change in the capturing direction.

The processor may be configured to display an object indicating that the permission to control the at least one camera is requested, in the display if the video call is made.

The processor may be configured to display an object indicating that the at least one camera is controlled, in the display if the approval information about the permission to control is received from the external electronic device.

The processor may be configured to generate a video call session for sending or receiving image data to or from the external electronic device, if the video call with the external electronic device starts, and to send the control signal through the video call session.

The processor may be configured to generate a video call session for sending or receiving image data to or from the external electronic device, if the video call with the is external electronic device starts, and to generate a control session for sending or receiving the control signal if the approval information about the permission to control is received from the external electronic device.

According to an embodiment of the present disclosure, an electronic device may include a housing, at least one camera exposed to an outside through the housing, a communication circuit situated in an interior of the housing, a user interface, a processor which is situated in the interior of the housing and which is electrically connected with the at least one camera, the communication circuit, and the user interface, and a memory electrically connected with the processor. The memory may store instructions, when executed by the processor, causing the processor to detect motion of a user by using at least one of the at least one camera or the user interface, to control the at least one camera based on the detected motion, to receive a request for transferring permission to control the at least one camera to an external electronic device through the communication circuit or the user interface, to receive a control signal for controlling the at least one camera from the external electronic device through the communication circuit, and to control the at least one camera based on the received control signal.

The electronic device may further include a mechanical structure that changes a direction of the at least one camera. The instructions may cause the processor to control the mechanical structure based on the received control signal.

The term "module" used herein may represent a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) is chip, a field-programmable gate array (FPGA), and a programmable-logic device for performing some operations, which are known or will be developed.

At least a part of an apparatus (e.g., modules or functions thereof) or a method (e.g., operations) may be implemented by instructions stored in a computer-readable storage medium in the form of a program module. The instruction, when executed by a processor (e.g., the processor 690 or the processor 1280), may cause the processor to perform a function corresponding to the instruction. The computer-readable storage medium may be a memory (e.g., the memory 660 or the memory 1250).

A computer-readable storage medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code, such as generated by a compiler, but also a high-level language code executable on a computer using an interpreter. The above-mentioned hardware device may be configured to operate as one or more software modules to perform operations according to an embodiment of the present disclosure, and vice versa.

A module or a program module may include at least one of the above elements, or a part of the above elements may be omitted, or additional other elements may be further included. Operations executed by modules, program modules, or other elements may be executed by a successive method, a parallel method, a repeated method, or a heuristic method. Also, a part of operations may be executed in different sequences, omitted, or other operations may be added.

While the present disclosure has been shown and described with reference to various embodiments, it should be understood by those skilled in the art that various changes in form and details may be made therein without departing from the spirit and scope of the present disclosure, which is defined, not by the detailed description and embodiments, but by the appended claims and their equivalents.

What is claimed is:
1. An electronic device comprising:
at least two cameras including a first camera and a second camera;
a communication module; and
a processor configured to:
make a video call with an external electronic device by using images captured by the at least two cameras;
control the first camera to capture a first image of a user;
control the second camera to capture a second image;
change a capturing direction of the first camera by tracking a motion of the user in order to capture the user continuously;
receive, from the external electronic device, through the communication module, a control signal for controlling the second camera;
change a capturing direction of the second camera based on the received control signal; and
transmit the first image and the second image to the external electronic device through the communication module.

2. The electronic device of claim 1, wherein the processor is further configured to control the second camera to change at least one of a capturing direction, a ratio of zoom-in to zoom-out, a resolution, brightness, focus, or a white balance of the second camera, based on the control signal.

3. The electronic device of claim 1, wherein the control signal corresponds to motion information of the external electronic device.

4. The electronic device of claim 1, wherein the control signal corresponds to motion information of a user of the external electronic device.

5. The electronic device of claim 1, further comprising:
a drive module that controls a motion of the electronic device,
wherein the processor is further configured to change at least one of a location of the electronic device and a capturing direction of the at least two cameras by controlling the drive module.

6. The electronic device of claim 1, wherein the processor is further configured to:
receive a request, from the external electronic device, through the communication module, for permission to control the second camera; and
sends approval information about the request for the permission to control, through the communication module, to the external electronic device, when a user input for approving the request for the permission to control is received.

7. The electronic device of claim 6, wherein the processor is further configured to:
perform user authentication, when the user input for approving the request for the permission to control is received; and
send the approval information, when the user authentication is completed.

8. The electronic device of claim 7, wherein the processor is further configured to control the second camera to capture the second image after the capturing direction of the second camera is changed into the capturing direction of the first camera, when the user input for approving the request for the permission to control is received.

9. The electronic device of claim 7, wherein the processor is further configured to:
send the first image, through the communication module, to the external electronic device, when the video call starts; and send the second image, through the communication module, to the external electronic device, when the user input for approving the request for the permission to control is received.

\* \* \* \* \*